(12) United States Patent
Esarey

(10) Patent No.: US 11,938,642 B2
(45) Date of Patent: Mar. 26, 2024

(54) SPLIT BLADE HOUSING WITH EXPANSION SLEEVE ASSEMBLY FOR POWER OPERATED ROTARY KNIFE

(71) Applicant: Bettcher Industries, Inc., Birmingham, OH (US)

(72) Inventor: Bernard J. Esarey, Lorain, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 317 days.

(21) Appl. No.: 17/387,607

(22) Filed: Jul. 28, 2021

(65) Prior Publication Data

US 2022/0016796 A1 Jan. 20, 2022

Related U.S. Application Data

(63) Continuation of application No. 16/591,260, filed on Oct. 2, 2019, now Pat. No. 11,077,571.

(51) Int. Cl.
*B26B 25/00* (2006.01)
*A22B 5/16* (2006.01)
*A22C 17/00* (2006.01)

(52) U.S. Cl.
CPC ............ *B26B 25/002* (2013.01); *A22B 5/165* (2013.01); *A22C 17/0006* (2013.01)

(58) Field of Classification Search
None
See application file for complete search history.

(56) References Cited

U.S. PATENT DOCUMENTS 1,220,345 A 3/1917 Koster
1,374,988 A 4/1921 Cooper
(Continued)

FOREIGN PATENT DOCUMENTS

CA 2796222 10/2011
CA 2883924 3/2014
(Continued)

OTHER PUBLICATIONS

Oct. 3, 2011 Decision and Opinion of the United States Court of Appeals for the Federal Circuit (Appeal No. 2011-1038, -1046) regarding the case styled *Bettcher Industries, Inc.* v. *Buzl USA, Inc. and Buzl Processor Distribution, LLC*, Case No. 3:08 CV 2423, U.S. District Court for the Northern District of Ohio, Judge Zouhary. The Decision and Opinion relates to U.S. Pat. No. 7,000,325, owned by the assignee of the present application. (47 pages).

(Continued)

*Primary Examiner* — Hwei-Siu C Payer

(57) ABSTRACT

A blade housing assembly for a power operated rotary knife including a split blade housing and an expansion sleeve assembly. The split blade housing including an annular blade support section and a mounting section extending from the blade support section. The mounting section includes a split extending through the mounting section and includes a first body portion and a second body portion on opposite sides of the split, the first body portion including a slot extending axially through the first body portion and movable between blade supporting and blade changing positions. The expansion sleeve assembly extends through the slot and includes a split sleeve changeable between first and second circumferences. The expansion sleeve assembly further including a fastener extends through the split sleeve and, when engaged with the split sleeve, maintains the split sleeve in the first circumference and secures the first body portion in the blade supporting position.

20 Claims, 21 Drawing Sheets

(56) References Cited

U.S. PATENT DOCUMENTS

| | | |
|---|---|---|
| 1,476,345 A | 12/1923 | McGee |
| 1,966,266 A | 7/1934 | Skelly |
| 2,266,888 A | 12/1941 | McCurdy et al. |
| 2,656,012 A | 10/1953 | Thorpe |
| 2,827,657 A | 3/1958 | Bettcher |
| 3,024,532 A | 3/1962 | Bettcher |
| 3,150,409 A | 9/1964 | Wilcox |
| RE25,947 E | 12/1965 | Bettcher |
| 3,269,010 A | 8/1966 | Bettcher |
| 3,349,485 A | 10/1967 | Bettcher |
| 3,461,557 A | 8/1969 | Behring |
| 3,512,519 A | 5/1970 | Hall |
| 3,592,519 A | 7/1971 | Martin |
| 3,688,403 A | 9/1972 | Bettcher |
| 3,816,875 A | 6/1974 | Duncan et al. |
| 3,852,882 A | 12/1974 | Bettcher |
| 3,897,998 A | 8/1975 | Someya et al. |
| 4,082,232 A | 4/1978 | Brewer |
| 4,170,063 A | 10/1979 | Bettcher |
| 4,178,683 A | 12/1979 | Bettcher |
| 4,198,750 A | 4/1980 | Bettcher |
| 4,236,531 A | 12/1980 | McCullough |
| 4,267,759 A | 5/1981 | Sullivan et al. |
| 4,326,361 A | 4/1982 | McGill |
| 4,336,651 A | 6/1982 | Caro |
| 4,363,170 A | 12/1982 | McCullough |
| 4,418,591 A | 12/1983 | Astle |
| 4,439,924 A | 4/1984 | Bettcher |
| 4,492,027 A | 1/1985 | Bettcher |
| 4,494,311 A | 1/1985 | McCullough |
| 4,509,261 A | 4/1985 | Bettcher |
| 4,516,323 A | 5/1985 | Bettcher et al. |
| 4,575,937 A | 3/1986 | McCullough |
| 4,575,938 A | 3/1986 | McCullough |
| 4,590,576 A | 5/1986 | Elpiner |
| 4,590,676 A | 5/1986 | Bettcher |
| 4,609,227 A | 9/1986 | Wild et al. |
| 4,637,140 A | 1/1987 | Bettcher |
| 4,690,597 A | 9/1987 | Liebig |
| 4,829,860 A | 5/1989 | VanderPol |
| 4,854,046 A | 8/1989 | Decker et al. |
| 4,858,321 A | 8/1989 | McCullough |
| 4,865,473 A | 9/1989 | De Vito |
| 4,909,640 A | 3/1990 | Nakanishi |
| 4,942,665 A | 7/1990 | McCullough |
| 5,031,323 A | 7/1991 | Honsa et al. |
| 5,033,876 A | 7/1991 | Kraus |
| 5,071,264 A | 12/1991 | Franke et al. |
| 5,078,024 A | 1/1992 | Cicotte et al. |
| 5,099,721 A | 3/1992 | Decker et al. |
| 5,230,154 A | 7/1993 | Decker et al. |
| 5,331,877 A | 7/1994 | Ishii |
| 5,419,619 A | 5/1995 | Lew |
| 5,484,331 A | 1/1996 | Buhlke |
| 5,499,492 A | 3/1996 | Jameson |
| 5,522,142 A | 6/1996 | Whited |
| 5,529,532 A | 6/1996 | Desrosiers |
| 5,582,041 A | 12/1996 | Spiess |
| 5,664,332 A | 9/1997 | Whited et al. |
| 5,692,307 A | 12/1997 | Whited et al. |
| 5,743,659 A | 4/1998 | Stewart |
| 5,749,661 A | 5/1998 | Moller |
| 5,761,817 A | 6/1998 | Whited et al. |
| 5,940,972 A | 8/1999 | Baris et al. |
| 5,971,413 A | 10/1999 | El-Kassouf |
| 6,247,847 B1 | 6/2001 | Lob |
| 6,354,949 B1 | 3/2002 | Baris et al. |
| 6,364,086 B1 | 4/2002 | Blaurock et al. |
| 6,604,288 B2 | 8/2003 | Whited et al. |
| 6,615,494 B2 | 9/2003 | Long et al. |
| 6,634,257 B2 | 10/2003 | Long et al. |
| 6,655,033 B2 | 12/2003 | Herrmann et al. |
| 6,662,452 B2 | 12/2003 | Whited |
| 6,665,940 B2 | 12/2003 | Sanders |
| 6,694,649 B2 | 2/2004 | Whited et al. |
| 6,751,872 B1 | 6/2004 | Whited et al. |
| 6,769,184 B1 | 8/2004 | Whited |
| 6,857,191 B2 | 2/2005 | Whited |
| 6,938,348 B2 | 9/2005 | Roncaglia |
| 6,978,548 B2 | 12/2005 | Whited et al. |
| 7,000,325 B2 | 2/2006 | Whited |
| 7,107,887 B2 | 9/2006 | Whited |
| 7,207,114 B2 | 4/2007 | Rosu et al. |
| 7,340,840 B2 | 3/2008 | Whited |
| 8,074,363 B2 | 12/2011 | Whited |
| 8,448,340 B2 | 5/2013 | Whited |
| 8,505,207 B2 | 8/2013 | Thien |
| 8,661,692 B2 | 3/2014 | Whited et al. |
| 8,671,580 B2 | 3/2014 | Whited |
| 8,695,222 B2 | 4/2014 | Whited |
| 8,726,524 B2 | 5/2014 | Whited et al. |
| 8,739,416 B2 | 6/2014 | Mascari |
| 8,745,881 B2 | 6/2014 | Thompson |
| 8,806,761 B2 | 8/2014 | Whited |
| 8,950,076 B2 | 2/2015 | Whited |
| 8,968,107 B2 | 3/2015 | Rapp et al. |
| 9,089,980 B2 | 7/2015 | Whited et al. |
| 9,121,438 B2 | 9/2015 | Mascari |
| 9,186,171 B2 | 11/2015 | Esarey et al. |
| 9,211,650 B2 | 12/2015 | Mascari et al. |
| 9,221,183 B2 | 12/2015 | Whited et al. |
| 9,227,332 B2 | 1/2016 | Thompson et al. |
| 9,265,263 B2 | 2/2016 | Whited et al. |
| 9,364,962 B2 | 6/2016 | Whited |
| 9,452,541 B2 | 9/2016 | Mascari et al. |
| 9,475,203 B2 | 10/2016 | Whited et al. |
| 9,522,473 B2 | 12/2016 | Mascari et al. |
| 9,573,283 B2 | 2/2017 | Thompson et al. |
| 9,579,810 B2 | 2/2017 | Mascari |
| 9,592,076 B2 | 3/2017 | Esarey et al. |
| 9,623,577 B2 | 4/2017 | Whited |
| 9,833,919 B2 | 12/2017 | Mascari et al. |
| 10,040,211 B2 | 8/2018 | Whited |
| 10,124,500 B2 | 11/2018 | Whited et al. |
| 10,471,614 B2 | 11/2019 | Whited et al. |
| 10,926,427 B2 | 2/2021 | Whited et al. |
| 11,077,571 B2 * | 8/2021 | Esarey ............... B26B 25/002 |
| 2002/0096027 A1 | 7/2002 | Whited et al. |
| 2003/0070301 A1 | 4/2003 | Hermann et al. |
| 2003/0084576 A1 | 5/2003 | Whited et al. |
| 2003/0131482 A1 | 7/2003 | Long et al. |
| 2003/0170115 A1 | 9/2003 | Bowen et al. |
| 2003/0196333 A1 | 10/2003 | Whited |
| 2004/0134326 A1 | 7/2004 | Long et al. |
| 2005/0126015 A1 | 6/2005 | Whited |
| 2005/0178009 A1 | 8/2005 | Whited |
| 2005/0217119 A1 | 10/2005 | Rapp |
| 2006/0037200 A1 | 3/2006 | Rosu et al. |
| 2006/0137193 A1 | 6/2006 | Whited |
| 2006/0211966 A1 | 9/2006 | Hatton et al. |
| 2007/0283573 A1 | 12/2007 | Levsen |
| 2007/0283574 A1 | 12/2007 | Levsen |
| 2008/0022537 A1 | 1/2008 | Clarke et al. |
| 2008/0078158 A1 | 4/2008 | Reist |
| 2008/0098605 A1 | 5/2008 | Whited et al. |
| 2009/0227192 A1 | 9/2009 | Luthi et al. |
| 2010/0101097 A1 | 4/2010 | Thiel |
| 2010/0111460 A1 | 5/2010 | Albrecht et al. |
| 2010/0170097 A1 | 7/2010 | Levsen |
| 2011/0185580 A1 | 8/2011 | Whited |
| 2011/0247220 A1 | 10/2011 | Whited et al. |
| 2012/0011980 A1 | 1/2012 | Kroger |
| 2012/0030952 A1 | 2/2012 | Levsen |
| 2013/0025134 A1 | 1/2013 | Mascari et al. |
| 2013/0025136 A1 | 1/2013 | Whited et al. |
| 2013/0025138 A1 | 1/2013 | Whited et al. |
| 2013/0025139 A1 | 1/2013 | Whited et al. |
| 2013/0056324 A1 | 3/2013 | Freund |
| 2013/0104404 A1 | 5/2013 | Levsen |
| 2013/0185944 A1 | 7/2013 | Thompson et al. |
| 2013/0205572 A1 | 8/2013 | Mascari |
| 2013/0243358 A1 | 9/2013 | Stork |
| 2013/0266250 A1 | 10/2013 | Brown |
| 2013/0326886 A1 | 12/2013 | Levsen |

(56) References Cited

U.S. PATENT DOCUMENTS

| | | |
|---|---|---|
| 2014/0074118 A1 | 3/2014 | Esarey et al. |
| 2014/0074120 A1 | 3/2014 | Esarey et al. |
| 2015/0377289 A1 | 12/2015 | Scheidel |
| 2016/0082612 A1 | 3/2016 | Mascari et al. |
| 2016/0279818 A1 | 9/2016 | Whited |
| 2016/0345996 A1 | 12/2016 | Esarey et al. |
| 2018/0162001 A1 | 6/2018 | Whited |
| 2018/0162002 A1 | 6/2018 | Whited et al. |
| 2018/0345514 A1 | 12/2018 | Whited et al. |
| 2019/0049042 A1 | 2/2019 | Wentworth et al. |
| 2022/0016796 A1* | 1/2022 | Esarey ............ B26B 25/002 |

FOREIGN PATENT DOCUMENTS

| | | | |
|---|---|---|---|
| CN | 2748683 | Y | 12/2005 |
| DE | 19958802 | C2 | 7/2001 |
| EP | 0689905 | A1 | 1/1996 |
| EP | 0816026 | A1 | 1/1998 |
| EP | 1226907 | A2 | 7/2002 |
| EP | 1356902 | A1 | 10/2003 |
| EP | 1403012 | A2 | 3/2004 |
| EP | 1527853 | A2 | 5/2005 |
| EP | 1527854 | A2 | 5/2005 |
| EP | 1916075 | A1 | 4/2008 |
| EP | 2353805 | A1 | 8/2011 |
| EP | 2497366 | A1 | 9/2012 |
| EP | 2557935 | B1 | 6/2016 |
| EP | 2B736684 | B1 | 1/2017 |
| FR | 1216947 | | 4/1960 |
| JP | 2000-52293 | A | 2/2000 |
| WO | WO 01/41980 | A1 | 6/2001 |
| WO | WO 2008/107490 | A1 | 9/2008 |
| WO | WO 2011/130057 | A1 | 10/2011 |
| WO | WO 2013/016019 | A1 | 1/2013 |
| WO | WO 2013/016020 | A1 | 1/2013 |
| WO | WO 2013/016021 | A1 | 1/2013 |
| WO | WO 2013/016022 | A1 | 1/2013 |
| WO | WO 2013/016024 | A1 | 1/2013 |
| WO | WO 2013/016344 | A1 | 1/2013 |
| WO | WO 2014/039601 | A1 | 3/2014 |
| WO | WO 2014/039609 | A1 | 3/2014 |
| WO | WO 2014/159349 | A1 | 10/2014 |
| WO | WO 2014/160043 | A1 | 10/2014 |
| WO | WO 2018/157198 | A1 | 9/2018 |

OTHER PUBLICATIONS

International Search Report and Written Opinion of the International Searching Authority dated Dec. 1, 2020 for PCT International Application No. PCT/US2020/048727, filed Aug. 31, 2020. PCT International Application No. PCT/US2020/048727 corresponds to and claims priority from the present application. (15 pages).

First Chinese Office Action and Search Report dated Apr. 13, 2023, and English translations of the aforesaid documents, for Chinese Application No. 202080069312.1, filed Apr. 1, 2022. Chinese Application No. 202080069312.1 is a national phase application of PCT International Application No. PCT/US2020/048727, filed Aug. 31, 2020. PCT International Application No. PCT/US2020/048727 claims priority from U.S. Appl. No. 16/591,260, filed Oct. 2, 2019, issued as U.S. Pat. No. 11,077,571, on Aug. 3, 2021. The present application claims priority from U.S. Appl. No. 15/591,260. (34 pages).

* cited by examiner

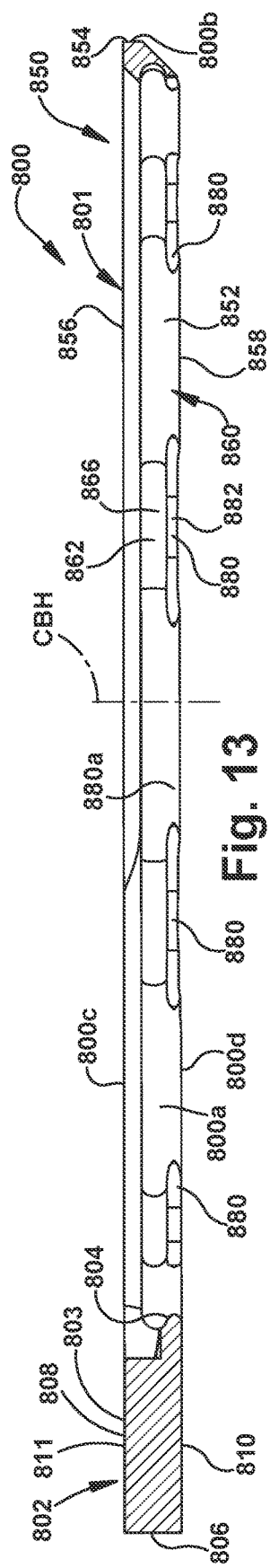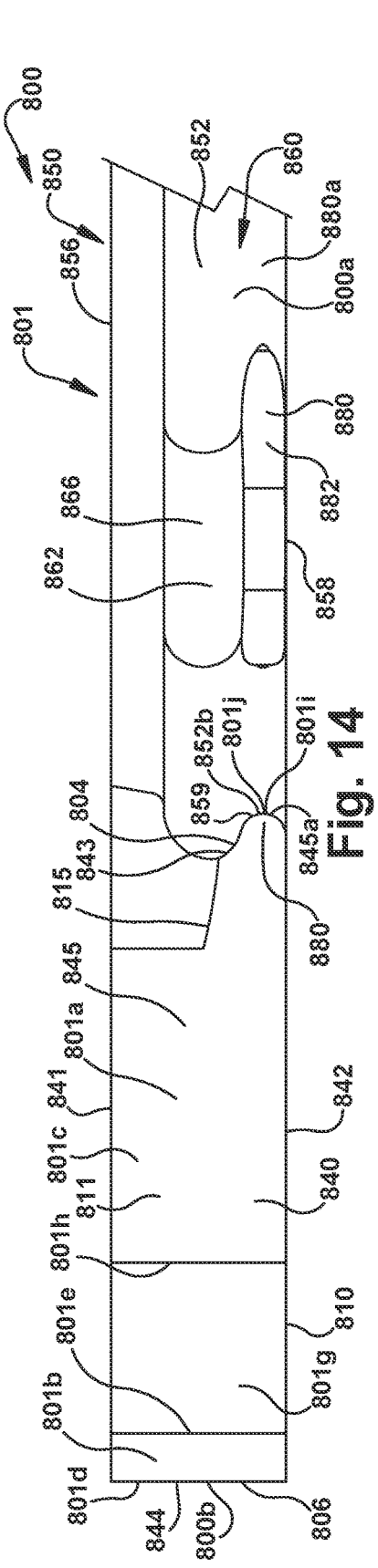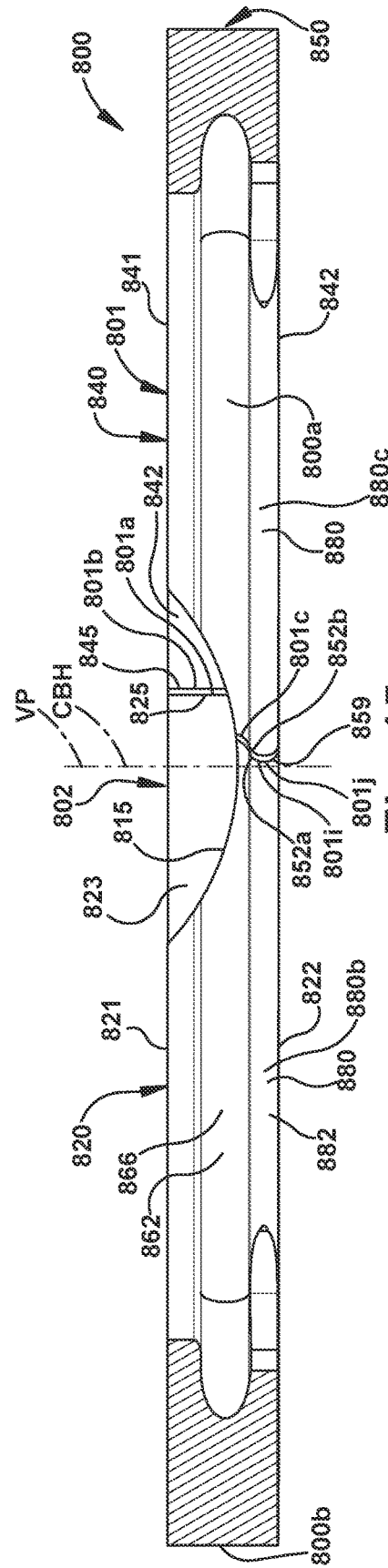

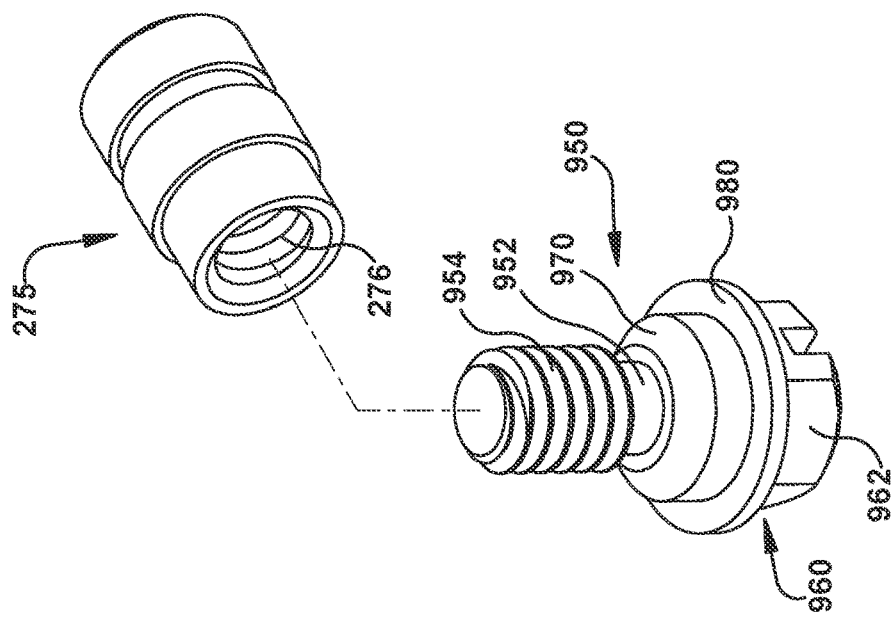
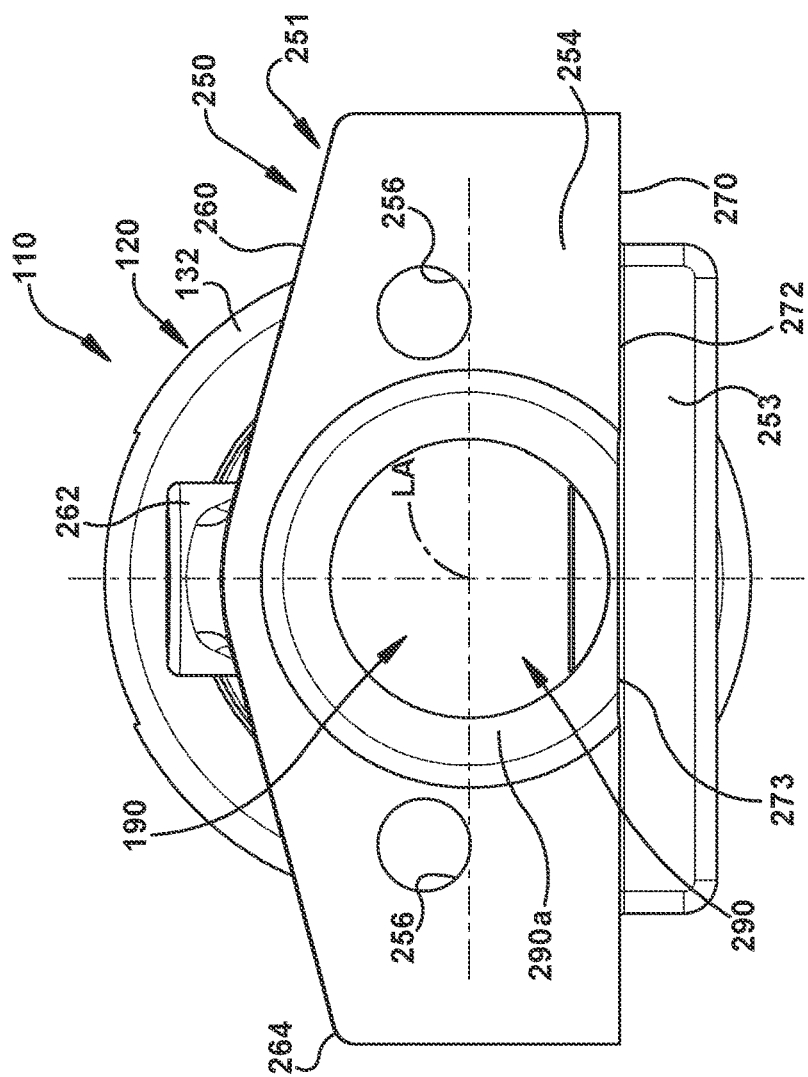

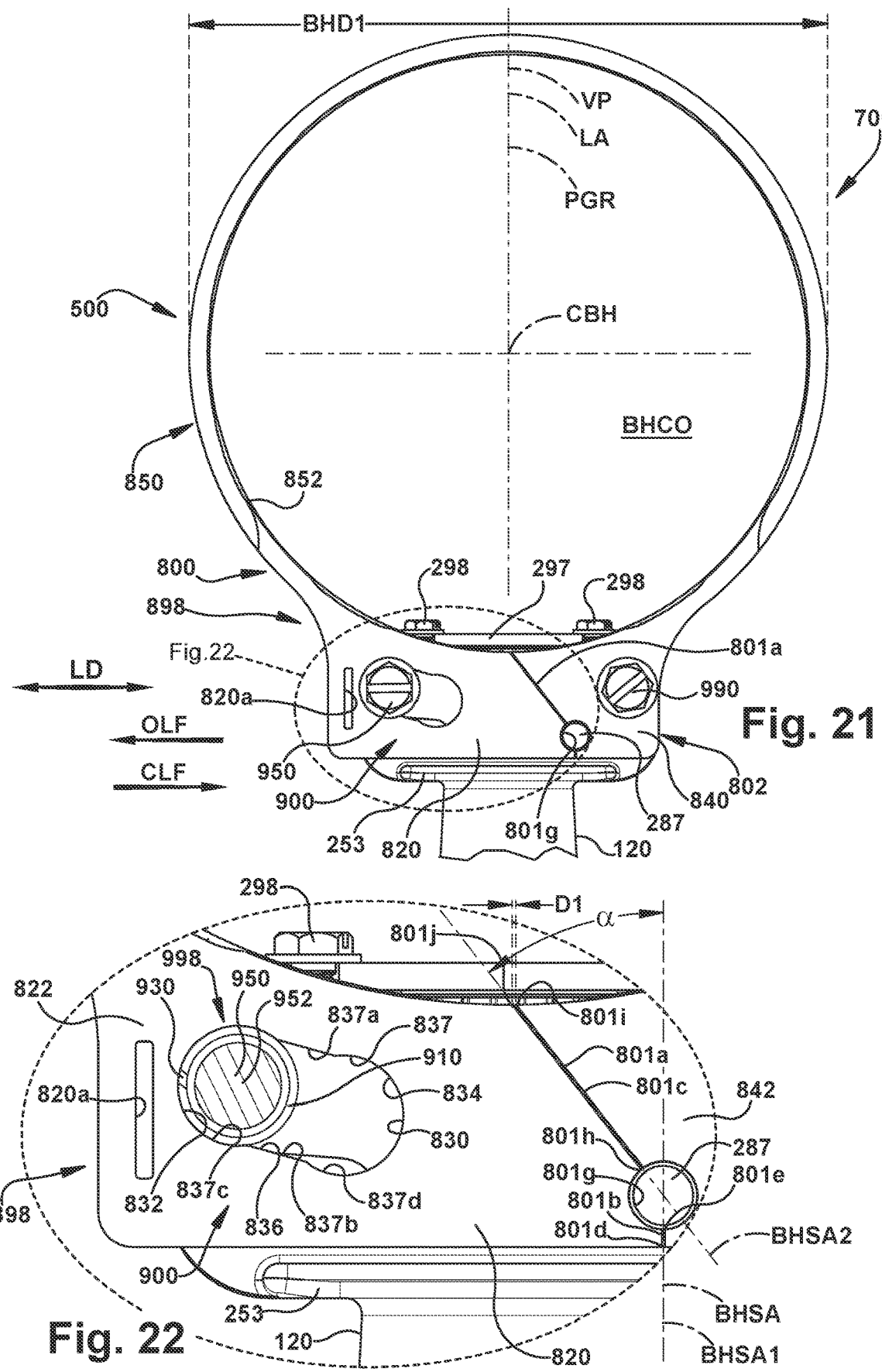

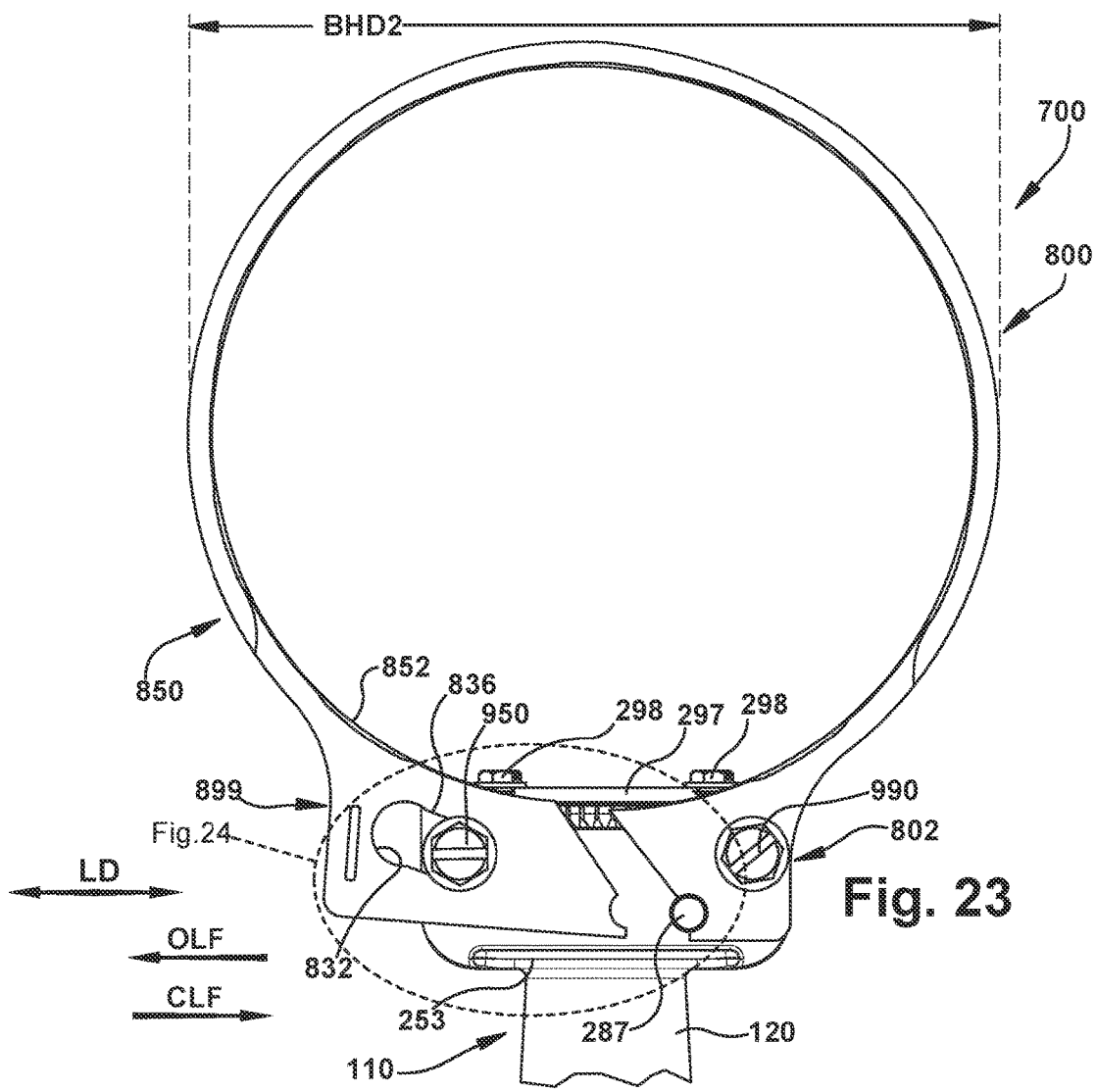
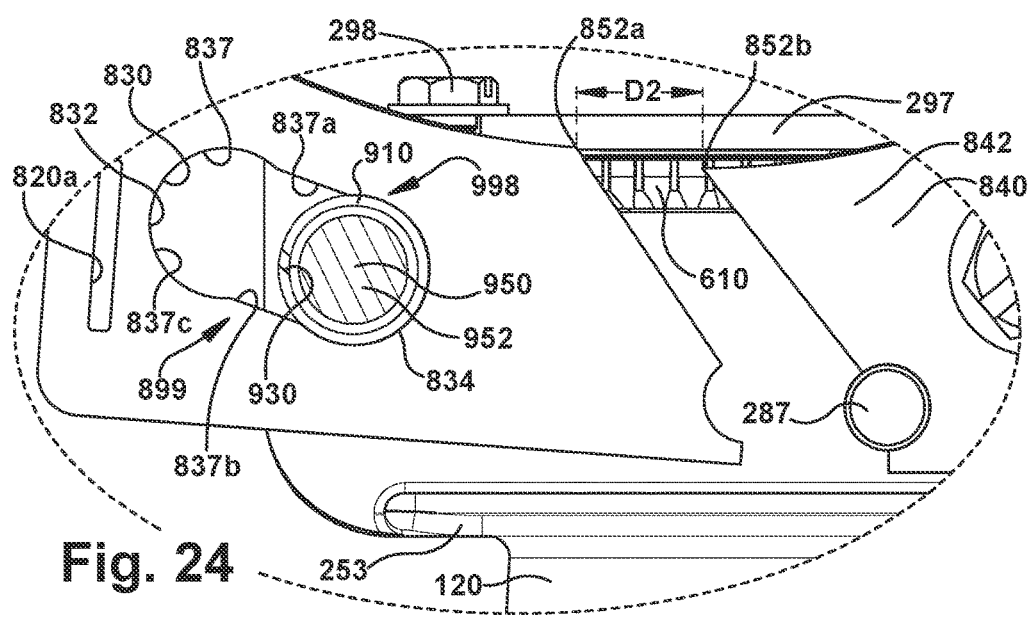

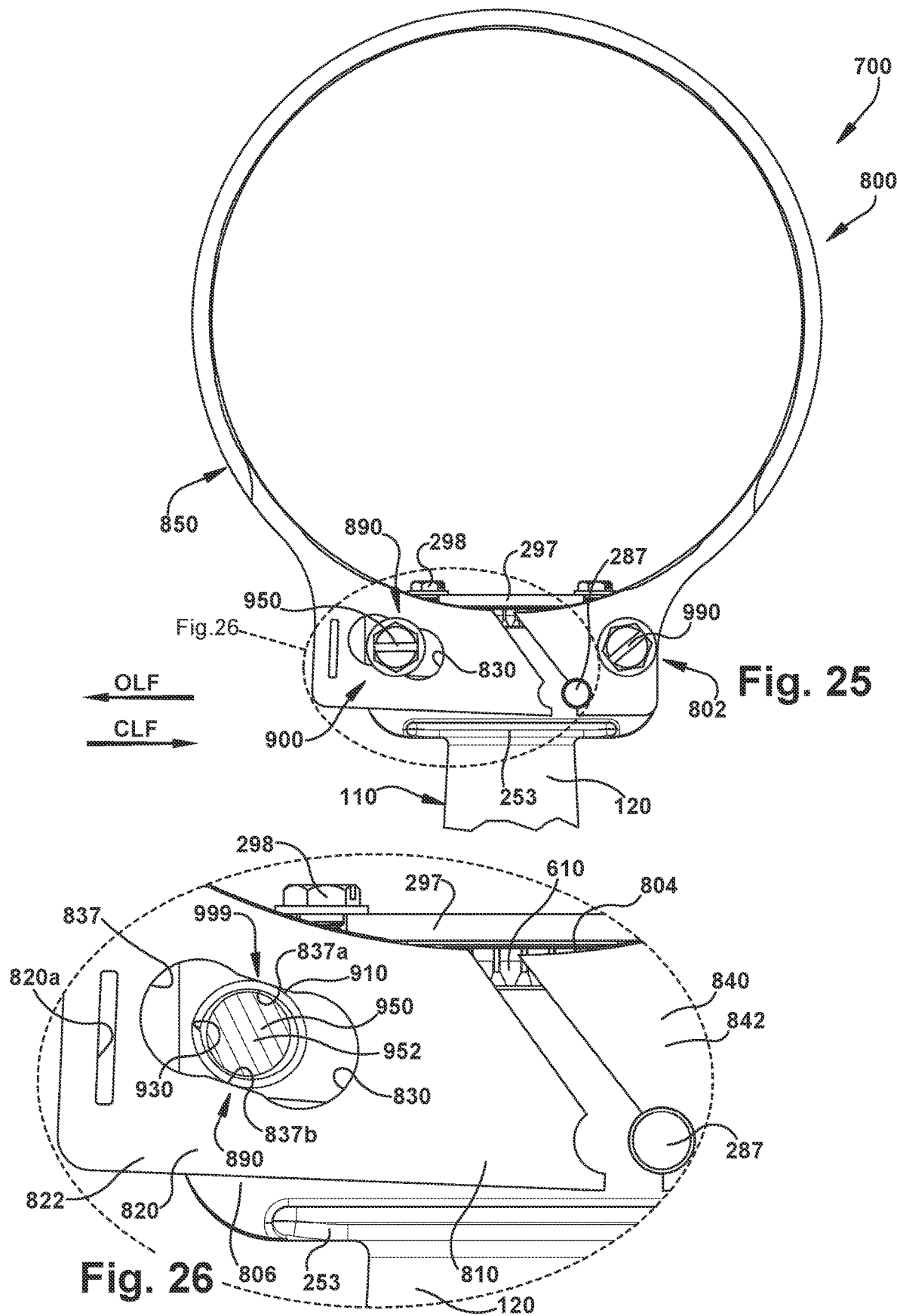

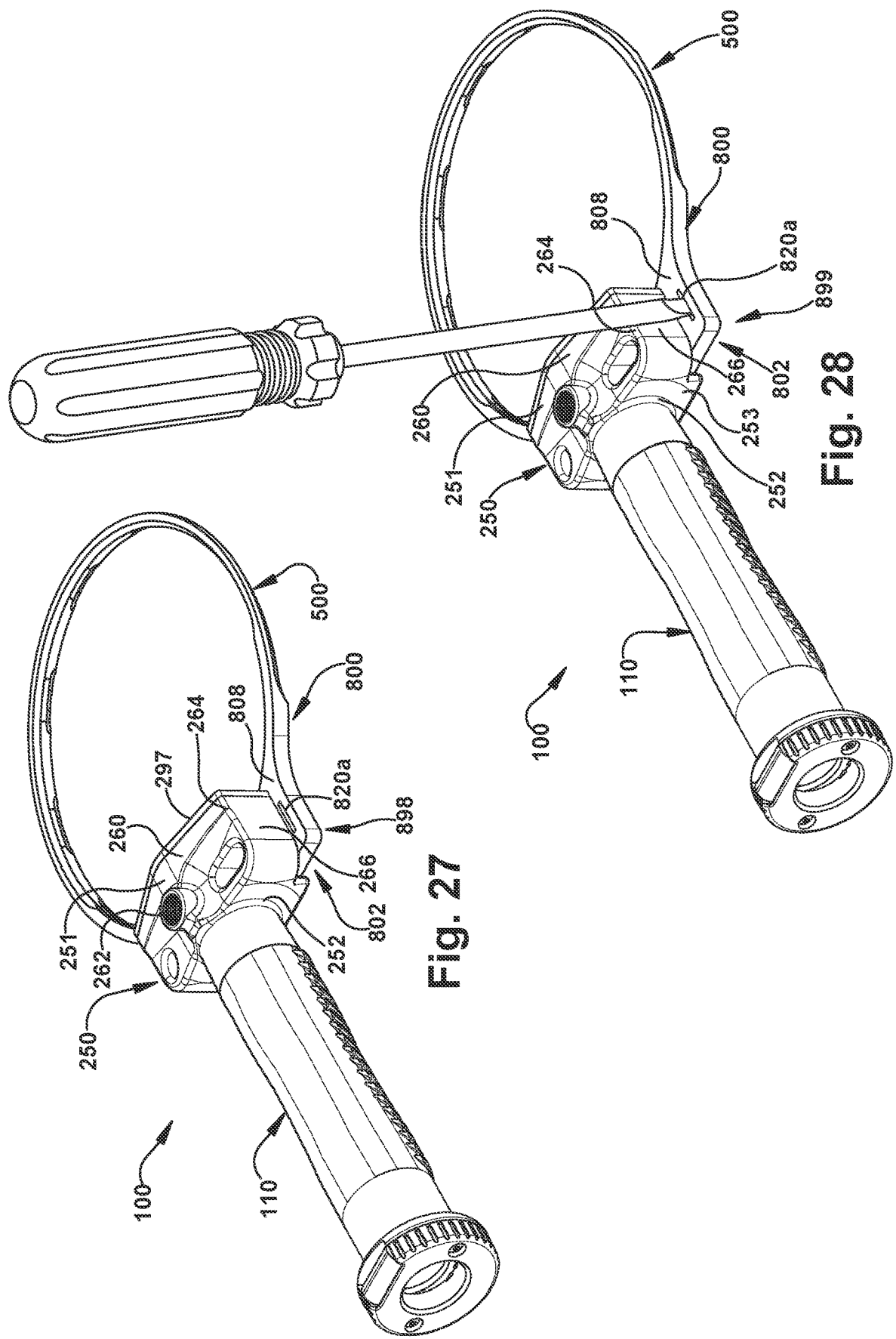

SPLIT BLADE HOUSING WITH EXPANSION SLEEVE ASSEMBLY FOR POWER OPERATED ROTARY KNIFE

CROSS-REFERENCE TO RELATED APPLICATIONS

This application claims priority under 35 USC 120 as a continuation application of U.S. application. Ser. No. 16/591,260, filed Oct. 2, 2019, published as U.S. Pub. No. US 2021/0101300 A1 on Apr. 8, 2021, issued as U.S. Pat. No. 11,077,571 on Aug. 3, 2021. The respective entire contents of the above-identified U.S. application Ser. No. 16/591,260, U.S. Publication No. US 2021/0101300 A1, and U.S. Pat. No. 11,077,571, are incorporated by reference herein in their respective entireties for any and all purposes.

TECHNICAL FIELD

The present disclosure relates to a hand-held, power operated rotary knife and, more specifically, to a blade housing assembly for supporting an annular rotary knife blade of a hand-held, power operated rotary knife for rotation about a central axis of rotation, the blade housing assembly including a split blade housing and an expansion sleeve assembly, the split blade housing having a first portion and a second portion on opposite sides of a split through a mounting section of the split blade housing, the first portion being movable with respect to the second portion between a blade supporting position and a blade changing position, an axial slot extending through the first portion including enlarged end portions connected by a passageway and the expansion sleeve assembly including a split lock sleeve or split sleeve extending though the slot, in a first condition of the split sleeve, the split sleeve received one of the enlarged end portions of the axial slot to maintain the split blade housing in one of the blade supporting position or the blade changing position and, in a second condition of the split sleeve, the split sleeve being radially compressed to pass through the passageway of the axial slot as the first portion moves with respect to the second portion between the blade supporting position and the blade changing position.

BACKGROUND

Hand-held, power operated rotary knives are widely used in meat processing facilities for meat cutting and trimming operations. Power operated rotary knives also have application in a variety of other industries where cutting and/or trimming operations need to be performed quickly and with less effort than would be the case if traditional manual cutting or trimming tools were used, e.g., long knives, scissors, nippers, etc. By way of example, power operated rotary knives may be effectively utilized for such diverse tasks as tissue harvesting or recovery, debriding/removal of skin tissue, bone tissue, tendon/ligament harvesting from human or animal tissue donors for medical purposes. Power operated rotary knives may also be used for taxidermy and for cutting and trimming of elastomeric or urethane foam for a variety of applications including vehicle seats. Power operated rotary knives may also be used in agricultural applications for cutting and trimming of foliage and the like.

Hand-held, power operated rotary knives typically include a handle assembly and a head assembly attachable to the handle assembly. The head assembly includes an annular blade housing and an annular rotary knife blade supported for rotation by the blade housing. The annular rotary blade of conventional power operated rotary knives is typically rotated by a drive assembly which include a flexible shaft drive transmission assembly extending through an opening in the handle assembly. The shaft drive assembly engages and rotates a pinion gear supported by the head assembly. The flexible shaft drive transmission assembly includes a stationary outer sheath and a rotatable interior drive shaft which is driven by an electric motor. Alternatively, the pinion gear may be driven by a pneumatic motor mounted within the handle assembly. Gear teeth of the pinion gear engage mating gear teeth formed on an upper surface of the rotary knife blade.

Upon rotation of the pinion gear by the drive shaft of the flexible shaft drive transmission assembly, the annular rotary blade rotates within the blade housing at a high RPM, on the order of 900-1900 RPM, depending on the structure and characteristics of the drive assembly including the motor, the shaft drive assembly, and a diameter and the number of gear teeth formed on the rotary knife blade. Power operated rotary knives are disclosed in U.S. Pat. No. 6,354,949 to Baris et al., U.S. Pat. No. 6,751,872 to Whited et al., U.S. Pat. No. 6,769,184 to Whited, U.S. Pat. No. 6,978,548 to Whited et al., U.S. Pat. No. 8,448,340 to Whited, U.S. Pat. No. 8,726,524 to Whited et al., and U.S. Pat. No. 10,040,211 to Whited, all of which are assigned to the assignee of the present invention and all of which are incorporated herein by reference in their respective entireties for any and all purposes. Power operated rotary knives having split blade housing with a cam mechanism to facilitate changing a diameter of an annular blade support section of the split blade housing between a blade supporting position and a blade changing position are disclosed in U.S. Pat. No. 10,124,500, issued Nov. 13, 2018, to Whited et al. and U.S. Pub. No. US 2018/0345514 A1, published Dec. 6, 2018, to Whited et al., both of which are assigned to the assignee of the present invention and both of which are incorporated herein by reference in their respective entireties for any and all purposes.

SUMMARY

In one aspect, the present disclosure relates to a blade housing assembly for supporting an annular rotary knife blade of a power operated rotary knife for rotation about a central axis of rotation. The blade housing assembly comprises: a split blade housing including: an annular blade support section including an inner wall; a mounting section extending from the blade support section; and a split extending through the mounting section and the inner wall of the blade support section and defining a split distance between first and second circumferential ends of the inner wall, the mounting section including a first body portion and a second body portion on opposite sides of the split, the first body portion including a slot extending axially through the first body portion having an enlarged first and second end portions connected by a passageway, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and an expansion sleeve assembly extending through the slot, the expansion sleeve assembly being stationary with respect to the first body portion and including: a split sleeve having a central opening and an axial split extending between first and second ends of the split sleeve, a circumference of the split sleeve changeable between a first condition having a first circumference and a second condition having a second circumference, the first circumference of the split sleeve being greater that the second circumference; and in the first condition, the split sleeve is received in the enlarged second end portion of the slot to secure the first body portion in the second blade changing position.

In another aspect, the present disclosure relates to a blade housing assembly for supporting an annular rotary knife blade of a power operated rotary knife for rotation about a central axis of rotation. The blade housing assembly comprises: a split blade housing including: an annular blade support section including an inner wall; a mounting section extending from the blade support section; and a split extending through the mounting section and the inner wall of the blade support section and defining a split distance between first and second circumferential ends of the inner wall, the mounting section including a first body portion and a second body portion on opposite sides of the split, the first body portion including a slot extending axially through the first body portion having an enlarged first and second end portions connected by a passageway, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and an expansion sleeve assembly extending through the slot, the expansion sleeve assembly being stationary with respect to the first body portion and including: a split sleeve having a central opening and an axial split extending between first and second ends of the split sleeve, a circumference of the split sleeve changeable between a first condition having a first circumference and a second condition having a second circumference, the first circumference of the split sleeve being greater that the second circumference; and in the first condition, the split sleeve is received in the enlarged first end portion of the slot to secure the first body portion in the first blade supporting position.

In another aspect, the present invention relates to a blade housing assembly for supporting an annular rotary knife blade of a power operated rotary knife for rotation about a central axis of rotation. The blade housing assembly comprises: a split blade housing including: an annular blade support section centered about a blade housing center line and including an inner wall; a mounting section extending from the blade support section; and a split extending through the mounting section and the inner wall of the blade support section and defining a split distance between first and second circumferential ends of the inner wall; the mounting section including a first body portion and a second body portion on opposite sides of the split, the first body portion including a slot extending through the first body portion having an enlarged first and second end portions and a passageway extending therebetween, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and an expansion sleeve assembly extending through the first slot, being stationary with respect to the first body portion, and including: a split sleeve having an axial split extending between first and second ends of the split sleeve and including a through bore extending through the split sleeve, a circumference of the split sleeve changeable between a first condition and a second compressed condition, the circumference of the split sleeve in the first condition being greater than in the second compressed condition; and a fastener including an enlarged head and a shaft extending from the enlarged head, the shaft extending through the through bore of the split sleeve, the enlarged head of the fastener bearing against the first end of the split sleeve to maintain the split sleeve in the first condition in the first enlarged end portion of the slot of the first body portion and secure the first body portion in the first blade supporting position.

In another aspect, the present invention relates to a power operated rotary knife comprising: a handle assembly and a frame body extending from a distal end of the handle assembly, the frame body including a mounting pedestal having a seating surface and a first axially extending opening and a second axially extending opening extending into the seating surface and a post extending axially from the seating surface; and a blade housing assembly supporting an annular rotary knife blade for rotation about a central axis of rotation, the blade housing assembly comprising: a split blade housing including: an annular blade support section including an inner wall; a mounting section extending from the blade support section; and a split extending through the mounting section and the inner wall of the blade support section and defining a split distance between first and second circumferential ends of the inner wall, the mounting section including a first body portion and a second body portion on opposite sides of the split, the first body portion including a slot extending axially through the first body portion having an enlarged first and second end portions connected by a passageway, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and an expansion sleeve assembly extending through the slot, the expansion sleeve assembly being stationary with respect to the first body portion and including: a split sleeve having a central opening and an axial split extending between first and second ends of the split sleeve, a circumference of the split sleeve changeable between a first condition and a second condition, the circumference of the split sleeve being greater in the first condition than the second condition; and in the first condition, the split sleeve is received in one of the enlarged first end portion of the slot to secure the first body portion in the first blade supporting position and second end portion of the slot to secure the first body portion in the second blade changing position.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 13 is a schematic vertical section view of the annular split ring blade housing of FIG. 11, as seen from a plane indicated by the line 13-13 in FIG. 11;

FIG. 14 is a schematic vertical section view of the annular split ring blade housing of FIG. 11, as seen from a plane indicated by the line 14-14 in FIG. 11;

FIG. 15 is a schematic vertical section view of the annular split ring blade housing of FIG. 11, as seen from a plane indicated by the line 15-15 in FIG. 11;

FIG. 16 is a schematic front elevation view of the one-piece, molded handle and frame body of the handle of the handle assembly and the frame body of the power operated rotary knife of FIG. 1;

FIG. 19 is a schematic front perspective view of a threaded fastener of the expansion sleeve assembly of the blade housing assembly of the head assembly of the power operated rotary knife of FIG. 1 and a mating threaded insert of the frame body mounting pedestal;

FIG. 21 is a schematic bottom plan view of the blade housing assembly of the power operated rotary knife of FIG. 1, with the annular rotary knife blade removed for clarity, illustrating the annular split ring blade housing in the blade supporting position;

FIG. 22 is a schematic enlarged bottom plan view of a portion of the blade housing assembly shown in FIG. 21 that is within a dashed line labeled FIG. 22;

FIG. 23 is a schematic bottom plan view of the blade housing assembly of the power operated rotary knife of FIG. 1, with the annular rotary knife blade removed for clarity, illustrating the annular split ring blade housing in the blade changing position;

FIG. 24 is a schematic enlarged bottom plan view of a portion of the blade housing assembly shown in FIG. 23 that is within a dashed line labeled FIG. 24;

FIG. 25 is a schematic bottom plan view of the blade housing assembly of the power operated rotary knife of FIG. 1, with the annular rotary knife blade removed for clarity, illustrating the annular split ring blade housing in a position that is intermediate the blade supporting position and the blade changing position;

FIG. 26 is a schematic enlarged bottom plan view of a portion of the blade housing assembly shown in FIG. 25 that is within a dashed line labeled FIG. 26;

FIG. 27 is a schematic top, rear perspective view of the power operated rotary knife of FIG. 1 with the annular split ring blade housing in the blade holding position;

FIG. 28 is a schematic top, rear perspective view of the power operated rotary knife of FIG. 1 having a tool inserted in an expansion slot of a first portion of a mounting section of the annular split ring blade housing to move the blade housing to the blade changing position.

DETAILED DESCRIPTION

Figure 1:
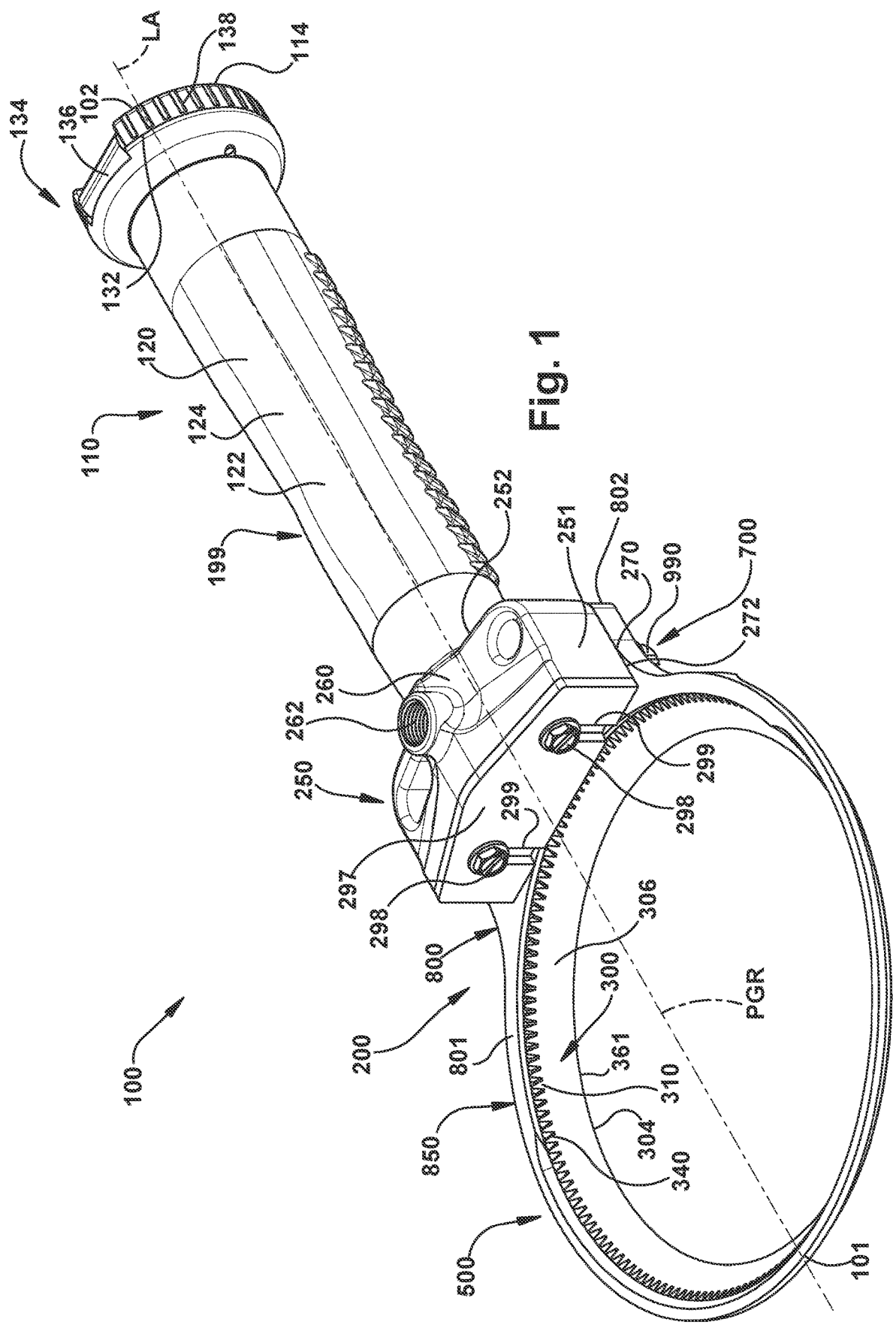
FIG. 1 is a schematic top, front perspective section view of a first exemplary embodiment of a power operated rotary knife.
Figure 2:
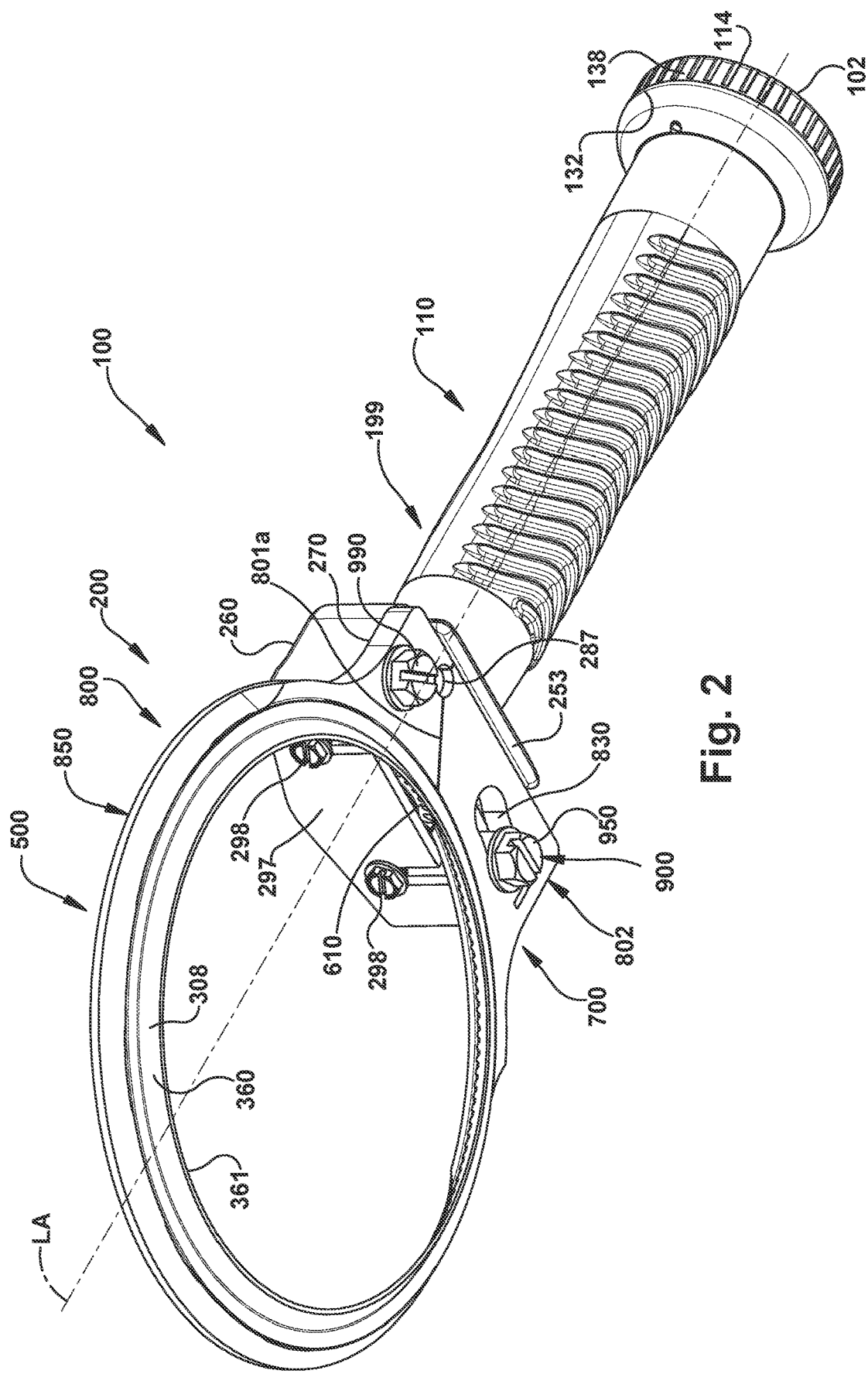
FIG. 2 is a schematic bottom, front perspective view of the power operated rotary knife of FIG. 1.
Figure 3:
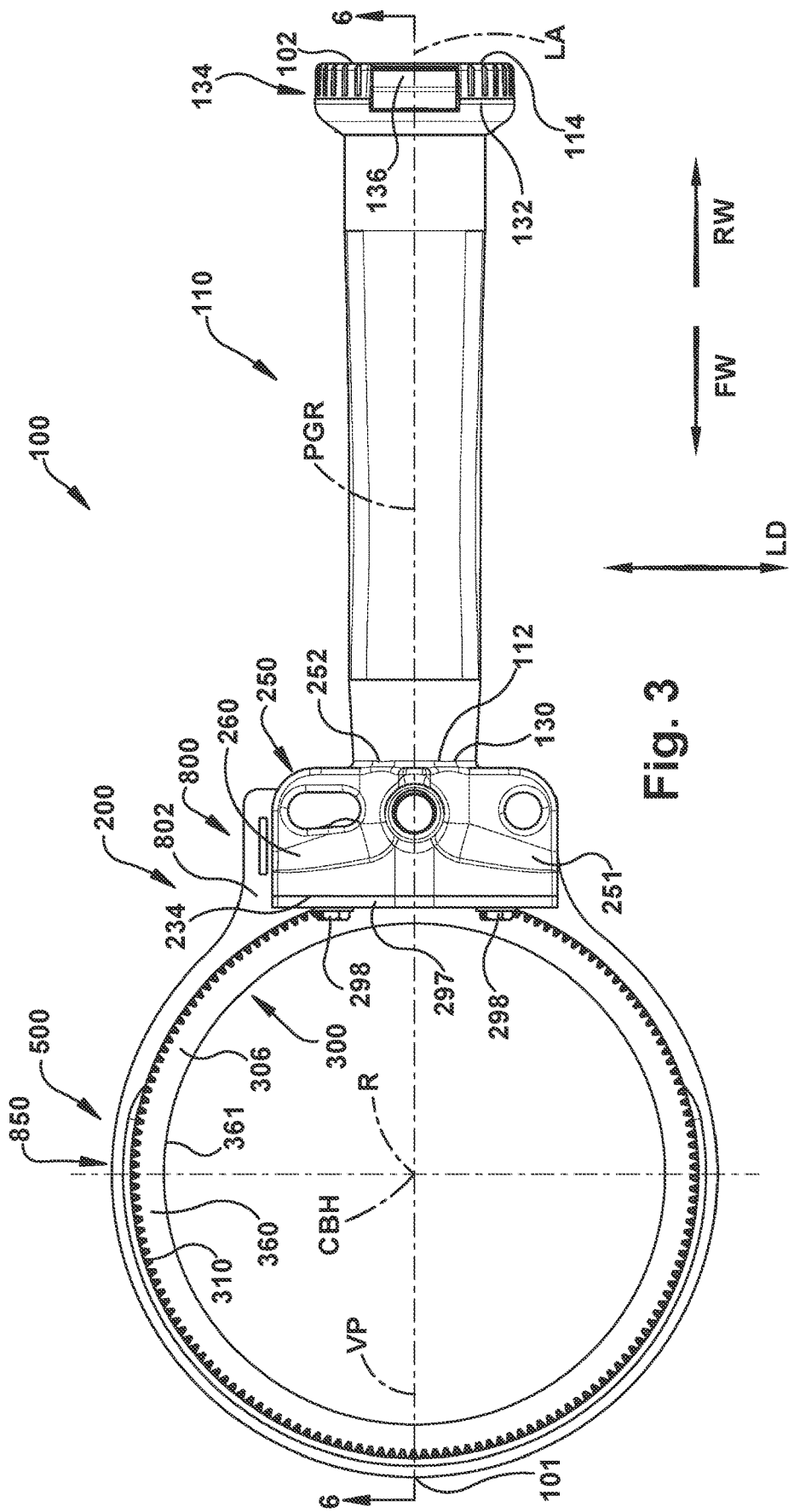
FIG. 3 is a schematic top plan view of the power operated rotary knife of FIG. 1.
Figure 4:
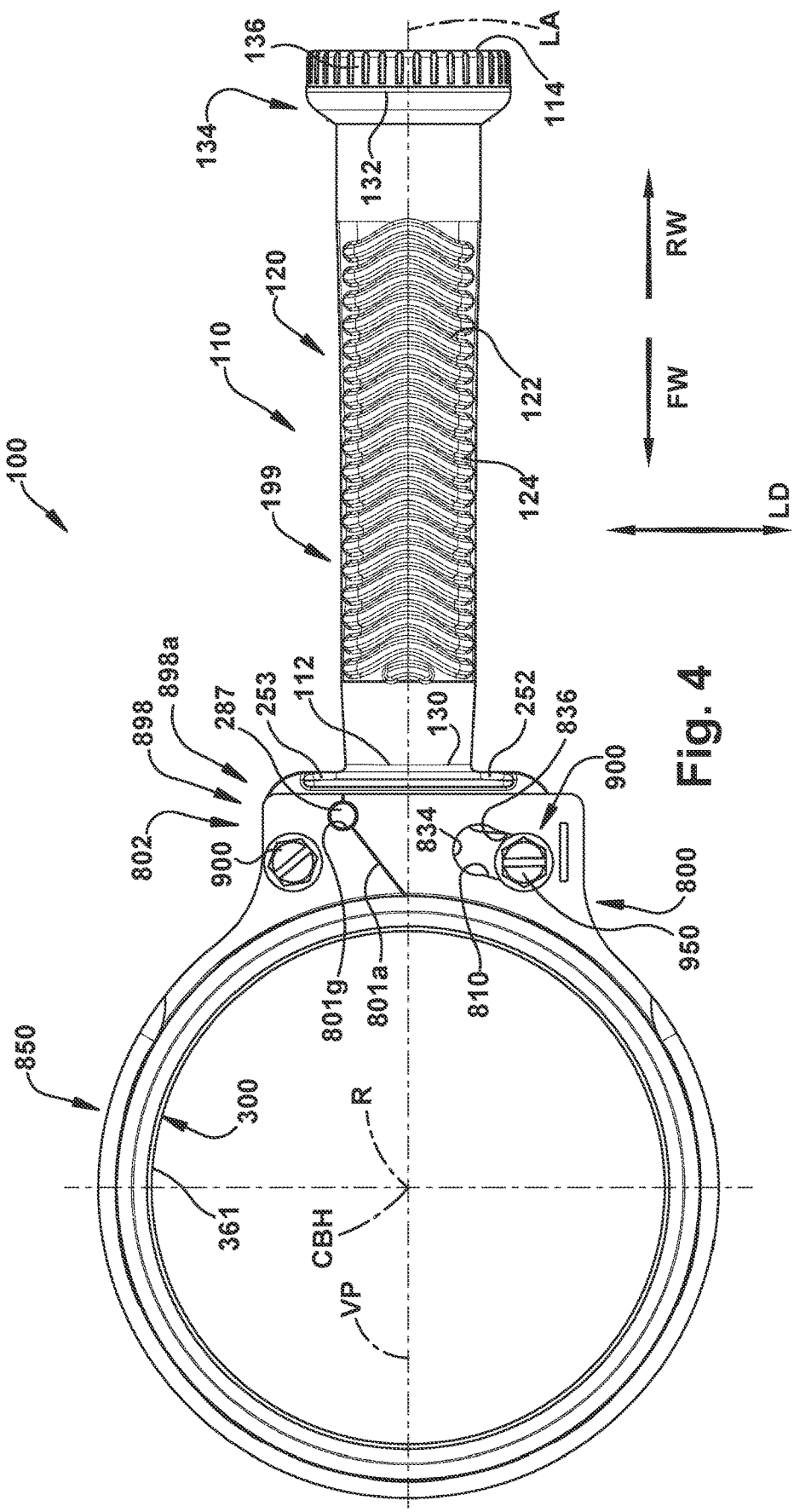
FIG. 4 is a schematic bottom plan view of the power operated rotary knife of FIG. 1.
Figure 5:
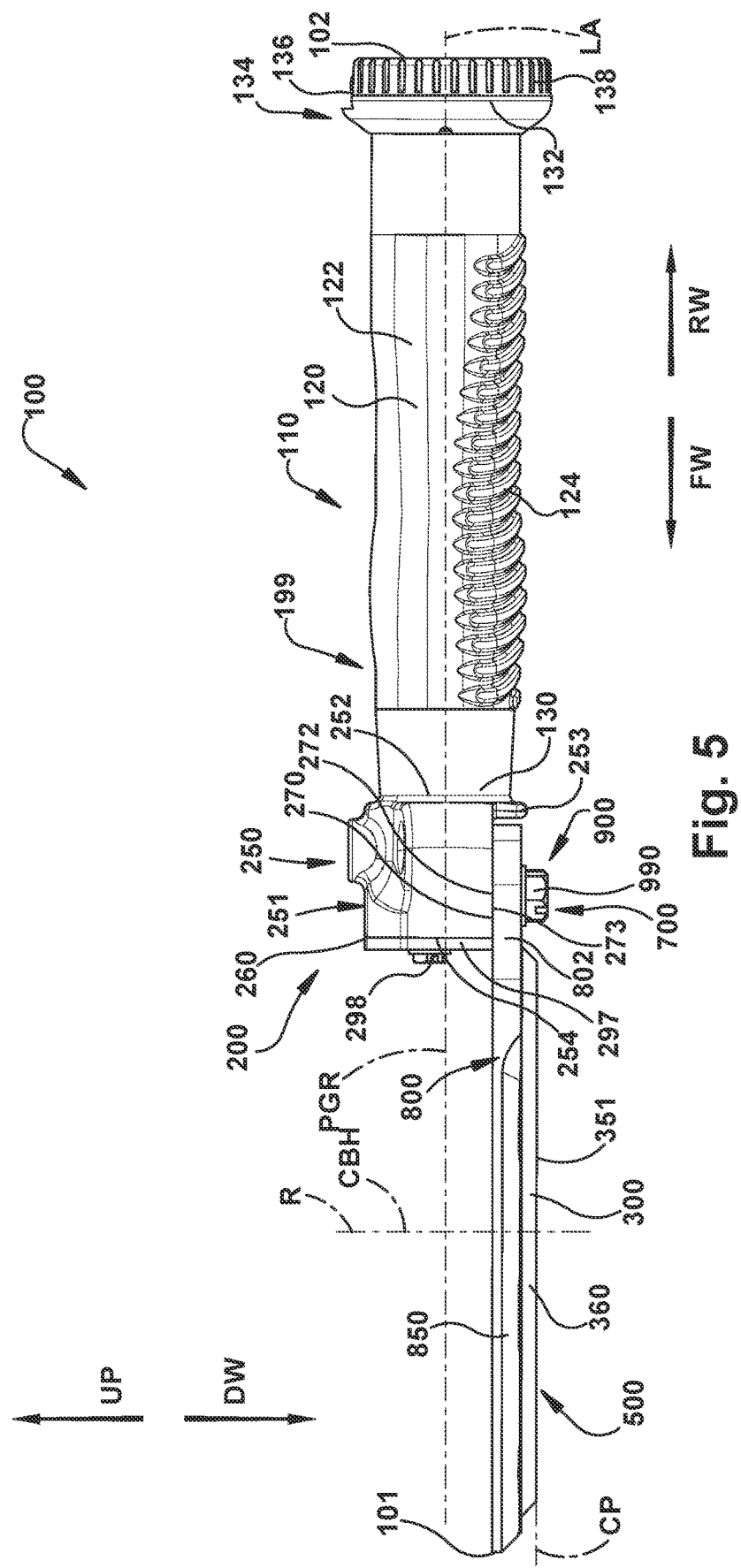
FIG. 5 is a schematic side elevation view of the power operated rotary knife of FIG. 1.

A first exemplary embodiment of a hand-held, power operated rotary knife of the present disclosure is shown generally at 100 in FIGS. 1-10. The power operated rotary knife 100 includes a handle assembly 110 and a head assembly 200 affixed to and extending from the handle assembly 110. The head assembly 200 includes a frame body 250 extending from a distal end 112 of the handle assembly 110 and an annular rotary knife blade 300 rotatably driven about a central axis of rotation R by a drive mechanism 600 of the power operated rotary knife 100. The head assembly 200 further includes a blade housing assembly 700 of the present disclosure which supports the annular rotary knife blade 300 for rotation about its central axis of rotation R. The frame body 250 includes a generally planar mounting pedestal 272 which is configured to releasably receive and support the blade housing assembly 700.

The blade housing assembly 700 of the present disclosure includes an annular split ring blade housing 800 and an expansion sleeve assembly 900. The split blade housing 800 comprises a split ring 801 including a mounting section 802, configured to be secured to a substantially planar seating surface 273 of the frame body mounting pedestal 272, and an annular blade support section 850, which supports the annular rotary knife blade 300 for rotation, extending from the mounting section 802. As best seen in FIGS. 11-12, 21-26 and 29, an opening or split 801a extends through the mounting and blade support sections 802, 850 of the split blade housing 800. An inner wall 852 of the blade support section 850 is discontinuous at the split 801a, the inner wall 852 having a split 859 which corresponds to a radially inner end or terminus of the split 801a. The split blade housing mounting section 802 includes a first body portion or first portion 820 and a second body portion or second portion 840 on opposite sides of the split 801a, the first portion 820 being movable with respect to the second portion 840 between a first, blade supporting position or blade supporting state 898 of the split blade housing 800 (FIGS. 11-12, 21-22 and 29), wherein, the annular rotary knife blade 300 is supported for rotation by the annular blade support section 850, and a second, blade changing position or blade changing state 899 of the split blade housing 800 (FIGS. 23-24), wherein an effective diameter of the annular blade support section 850 is enlarged to allow the annular rotary knife blade 300 to be removed for resharpening or changing the blade 300. When the split blade housing 800 is in the first, blade holding position 898, the first portion 820 of the blade housing mounting section 802 is adjacent the second portion 840 of the blade housing mounting section 802, being separated only by the unexpanded split 801a, as illustrated schematically, for example, in FIGS. 11-12 and 21-22. And, when the split blade housing 800 is in the second, blade changing position 899, the first portion 820 of the blade housing mounting section 802 is moved laterally away from the second portion 840 of the blade housing mounting section 802 such that the split 801a is wider or laterally expanded (as viewed in top plan or bottom plan views), as illustrated schematically, for example, in FIGS. 23 and 24.

The split blade housing 800, in one exemplary embodiment, is fabricated of a strong and resilient material such as a hardenable grade of alloy steel or a hardenable grade of stainless steel and, when moved to an expanded diameter condition (i.e., the blade changing position 899), the natural tendency for the blade housing 800 is to revert or spring back to an unexpanded or rest position (i.e., the blade supporting position 898). Because of the elasticity of the split blade housing 800, an application of force is required to be applied in the lateral direction (i.e., in the direction labeled as LD in FIGS. 8 and 11) to first portion 820 such that the first portion 820 moves with respect to the second portion 840 from the blade supporting position 898 of the split blade housing 800 to the blade changing position 899. When moving from the blade holding position 898 to the blade changing position 899, a circumferential distance or gap as measured at the inner wall 852 of the annular blade support section 850 increases from a first value D1 (FIG. 29) to a larger second value D2 (FIG. 24) as the first body portion 820 is moved or pivoted away from the second body portion 840 of the mounting section 802. In the blade supporting position 898, the inner wall 852 of the annular blade support section 850 is centered about a blade housing center line CBH (FIG. 11), which is substantially coincident with the blade central axis of rotation R. In the blade housing assembly 700 of the present disclosure, an axially extending slot or axial slot 830 extends through upper and lower surfaces 821, 822 of the first portion 820 of the mounting section 802. The axial slot 830 includes first and second enlarged end portions 832, 834 connected by a central passageway 836. The axially extending slot 830 is defined by a substantially vertical wall 837 defining the perimeter of the slot 830. A width W (FIG. 11) of the passageway 836, as measured between opposing or facing wall portions 837a, 837b of the wall 837 of the passageway 836, is smaller than the respective diameters of the first and second enlarged end portions 832, 834, resulting, as viewed in top plan view, in a generally dog-bone shape of the axial slot 830. In one exemplary embodiment, the respective diameters of the wall portions 837c, 837d of the wall 837 corresponding to the first and second enlarged end portions 832, 834 of the axial slot 830 are substantially identical.

Figure 18:
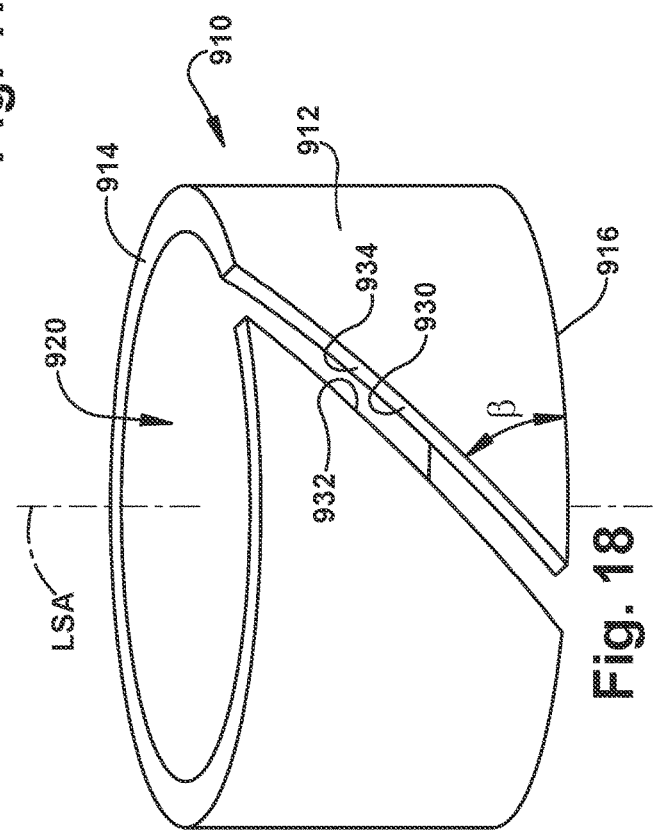
FIG. 18 is a schematic front perspective view of a split lock sleeve of the expansion sleeve assembly of the blade housing assembly of the head assembly of the power operated rotary knife of FIG. 1.

The blade housing assembly 700 further comprises the expansion sleeve assembly 900 including a split lock sleeve or split sleeve 910 (FIG. 18) positioned within the axially extending slot 830 of the first portion 820 of the mounting section 802. The split sleeve 910 and a cooperating fastener 950 extending through a central opening or through bore 920 of the split sleeve 910 are stationary with respect to the movable first portion 820 of the mounting section 802 of the split blade housing 800. The fastener 950 is affixed to the mounting pedestal 272 of the frame body 250. As best seen in FIG. 18, in one exemplary embodiment, the split sleeve 910 comprises a cylindrical wall 912 defining the central opening or through bore 920. The split sleeve 910 further includes an axially extending split 930 extending between and through opposite ends 914, 916 of the cylindrical wall 912 and is fabricated of a material, such as a spring steel or alloy or other material with similar characteristics, with a predetermined elasticity or spring constant. The split sleeve 910, in an uncompressed condition 998, has a first outer diameter, which is sized to be snugly received in one of the first and second enlarged end portions 832, 834 of the axial slot 830 of the first portion 820 of the mounting section 802. Further and advantageously, because of the axially extending split 930, the split sleeve 910 may be radially compressed to a compressed condition 999 wherein the outer diameter is decreased to a second, smaller, compressed diameter, as compared to the first, larger diameter of the split sleeve 910 in the uncompressed condition 998. That is, in a first, uncompressed condition 998 of the split sleeve 910, the split sleeve 910 received a selected one of the enlarged end portions 832, 834 of the axial slot 830 to maintain the split blade housing 800 in selected one of the blade supporting position 898 or the blade changing position 899. Advantageously, the split lock sleeve or split sleeve 910 maintains the split blade housing 800 in the selected one of the blade supporting position 898 or the blade changing position 899 without the need for application of any additional external force. When moving the mounting section first portion 820 with respect to the second portion 840 to move the first portion 820 from the first blade supporting position 898 (FIGS. 21 and 22) to the second blade changing position 899 (FIGS. 23 and 24) (or vice versa) the split lock sleeve 910 passes through a third, intermediate position 890 (FIGS. 25 and 26). The third, intermediate position 890 of the mounting section first body portion 820 is defined by the central passageway 836 of the axial slot 830. When in the third, intermediate position 890, the blade housing 800 is intermediate the first, blade supporting and second, blade changing positions 898, 899, that is, the first body portion 820 is intermediate the first, blade supporting and second, blade changing positions 898, 899. The split lock sleeve 910 is compressed to the second, compressed condition 999 and assumes the second, smaller outer diameter as defined by the width W of the central passageway 836 of the axial slot 830.

When the first body portion 820 of the blade housing mounting section 802 reaches the blade changing position 899, the split lock sleeve 910 completely passes through the central passageway 836 of the axial slot 830 and the split lock sleeve 910 returns or expands to its first, uncompressed condition 998 and snugly seats itself in the second enlarged end 834 of the axial slot 830. Stated another way, as the first body portion 820 is moved with respect to the second body portion 840 such that first body portion 820 is in the third, intermediate position 890, the split lock sleeve 910 is necessarily forced into the second, compressed condition 999 of the split lock sleeve 910. In the third, intermediate position 890, that is, as the first portion 820 of the blade housing mounting section 802 moves with respect to the second portion 840 between the blade holding position 898 and the blade changing position 899 of the split blade housing 800, the split lock sleeve 910 is in the compressed condition 999 and has the second, smaller outer diameter which corresponds to the width W of the central passageway 836 of the axial slot 830. Advantageously, as noted above, the elasticity or spring characteristics of the split lock sleeve 910 of the expansion sleeve assembly 900 of the present disclosure securely holds the split blade housing 800 in the blade changing position 899 without the need for a constant external application of pressure to the first portion 820 of the blade housing mounting section 802, as would otherwise be necessary.

It should be recognized that as used here, the term first, uncompressed condition or first, expanded condition 998 refers to the split lock sleeve 910 (and its associated outer diameter) when the sleeve is seated in the first and second enlarged end portions 832, 834 of the axial slot 830 of the first portion 820 of the mounting section 802. By manufacturing tolerances or by design and/or the desire to have the split lock sleeve 910 snugly fit into the first and second enlarged end portions 832, 834 of the axial slot 830 of the first portion 820 of the mounting section 802, the split lock sleeve 910 may be either: a) in a truly, uncompressed condition when seated in the first and second enlarged end portions 832, 834 of the axial slot 830 of the first portion 820 of the mounting section 802; or, alternatively, b) in a slightly compressed condition due to the fact that the outer diameter of the split lock sleeve 910 may be slightly larger than a diameter defined by the inner wall portion 837c of the first enlarged end portion 832 (if the split lock sleeve 910 is in the enlarged end portion 832) or a diameter defined by the inner wall portion 837d of the second enlarged end portion 834 of the axial slot 830 (if the split lock sleeve 910 is in the enlarged end portion 834).

It should be understood when the split lock sleeve 910 is in the central passageway 836 of the axial slot 830 (i.e., in the third, intermediate position 890), the split lock sleeve 910 is in the second, compressed condition 999 and has a second, smaller outer diameter which corresponds to the width W of the central passageway 836 of the axial slot 830. By contrast, when the split lock sleeve 910 is in the first, uncompressed condition 998, the split lock sleeve 910 necessarily has a first, larger outer diameter, which is larger than the second, smaller outer diameter of the second, compressed condition 999. The split lock sleeve 910 in the first, uncompressed condition 998 substantially corresponds to the diameter defined by the inner wall portion 837c of the first enlarged end portion 832 when the split lock sleeve 910 is in the first enlarged end portion 832 and substantially corresponds to the diameter defined by the inner wall portion 837d of the second enlarged end portion 834 when the split lock sleeve 910 is in the second enlarged end portion 834.

Additionally, in one exemplary embodiment, expansion sleeve assembly 900 further includes the threaded fastener 950 which extends through the through bore or central opening 920 of the split lock sleeve 910 and threads into a threaded opening 276 of an insert 275 of the mounting pedestal 272 of the frame body 250. Because the threaded fastener 950 is affixed to the frame body mounting pedestal 272 is functions to hold the split lock sleeve 910 stationary with respect to the movable first portion 820 of the mounting section 802 of the split blade housing 800 as the movable first portion 820 moves or pivots between the first, blade supporting position 898 and the second, blade changing position 899. Advantageously, when the split blade housing 800 is in the blade supporting position 898, the split lock sleeve 910 is seated in the first enlarged end portion 832 of the axial slot 830, the threaded fastener 950 may be tightened such that a lower shoulder 970 of an enlarged head 960 of the fastener 950 engages and bears against the first, upper end 914 of the split lock sleeve 910. Advantageously, the lower shoulder 970 is inclined or angled so as to cause cylindrical wall 912 of the split lock sleeve 910 to be forced radially outwardly against an opposing cylindrical wall 837c defining the first enlarged end portion 832 of the axial slot 830. By tightening the fastener 950, the fastener shoulder 970 is forced or urged against the first end 914 of the cylindrical wall 912 of the split lock sleeve 910 causing the cylindrical wall 912 of the split lock sleeve 910 to be forced radially outwardly against the facing cylindrical wall portion 837c of the first enlarged end portion 832 of the axial slot 830 of the first portion 820 of the split blade housing 800. Thus, tightening the fastener 950 of the expansion sleeve assembly 900 causes the split lock sleeve 910 to securely maintain the split blade housing 800 in the first, blade supporting position 898a and the corresponding first, blade supporting position 898 of the blade housing 800.

Once a sharpened annular rotary knife blade 300 is installed or positioned in the split blade housing 800 and the first body portion 820 of the blade housing mounting section 802 is moved or pivoted back toward the second body portion 840, the split lock sleeve 910 snaps into its uncompressed condition 998 and seats into the first enlarged end portion 832 of the axially extending slot 830 thereby holding, securing or maintaining the split blade housing 800 in the first, blade supporting position 898 and the first body portion 820 in the corresponding first, blade supporting position 898a. Upon tightening the fastener 950, the split lock sleeve wall 912, which is already seated in the first enlarged end portion 832 of the axial slot 830 of the first portion 820 of the split blade housing 800, is strongly forced against the facing cylindrical wall portion 837c of the first enlarged end portion 832 of the axial slot 830.

There are at least two advantages resulting from the extra securement of the first portion 820 of mounting section 802 of the split blade housing 800 provided by tightening the fastener 950 when the first portion 820 in the first, blade supporting position 898a. First, the extra securement of the split blade housing 800 in the first, blade supporting position 898a provided by the tightened fastener 950 advantageously allows for a "set it and forget it" mode of operation of the power operated rotary knife 100 of the present disclosure. In the power operated rotary knife 100 of the present disclosure, no operator adjustments to the blade support section diameter during operation of the power operated rotary knife 100 are required or permitted by the blade housing assembly 700. Advantageously, this enables a desired running or operating clearance between the bearing region 320 of the annular rotary knife blade 300 and the corresponding bearing region 860 of the blade support section 850 of the split blade housing 800 to be precisely preset by the manufacture for proper operation and desired operating characteristics of the assembled combination 500 of the annular rotary knife blade 300 and split blade housing 800, while avoiding the problem of an inexperienced operator attempting to change the operating clearance by making adjustments to increase or decrease the diameter of the blade support section 850 during the course of operating the power operated rotary knife 100 based on "feel" or "guessing" by the operator.

The elimination of adjustments to the preset running or operating clearance via adjustments to the diameter of the blade support section 850 results in reduced operator downtime resulting from ceasing cutting and trimming operations to make one or more adjustments during the course of a work shift. Additionally, adjustments by an inexperience operator may result in suboptimal operation of the power operated rotary knife 100 resulting from an inexperienced operator adjusting the diameter of the blade support section 850 to a condition where the operating clearance to too loose (blade 300 bounces around or vibrates to an excessive degree causing operator fatigue and resulting in excessive component wear or failure) or too tight (blade 300 is too tightly constrained such that excessive heat is generated and/or excessive component wear occurs). Description of operating or running clearance of a power operated rotary knife is disclosed in U.S. Pat. No. 10,040,211 to Whited, issued on Aug. 7, 2018, and assigned to the assignee of the present application. As set forth above, U.S. Pat. No. 10,040,211 has been incorporated by reference herein in its entirety.

Second, depending on the application of the power operated rotary knife 100, the annular rotary knife blade 300 may be subject to large cutting reaction forces. For example, if the power operated rotary knife 100 is used for cutting or trimming meat portions, the operator in manipulating the knife 100 may cause a cutting edge 361 of a blade section 360 of the annular rotary knife blade 300 to forcefully encounters or contact a bone disposed in the meat portion being cut or trimming. The annular rotary knife blade 300 is supported for rotation about the blade central axis of rotation R by the blade support section 850 of the split blade housing 800 and specifically, a blade-blade housing bearing structure 550 between respective bearing regions 320, 860 of the annular rotary knife blade 300 and the split blade housing 800 support the blade 300 for rotation. Such large cutting reaction forces applied to the annular knife blade 300 by contact with a bone or the like are necessarily transmitted to the blade housing 800 via the blade-blade housing bearing structure 550. As the cutting edge 361 of the annular rotary knife blade 300 may encounter bones and/or similar hard materials at various circumferential positions about the 3600 extent of the blade support section 850 and at various cutting angles between the meat portion being trimmed or cut and the blade section 360. Thus, it possible that the cutting reaction forces during operation of the knife 100 are at such locations and angles as would tend to urge the first portion 820 of the blade housing 800 to be moved or pivoted away from the second portion 840, thereby causing the split blade housing 800 to be urged toward the second, blade changing position 899. Any movement of the first portion 820 of the blade housing 800 with respect the second body portion 840 during operation of the power operated rotary knife 100 is undesirable as the diameter of the blade support section 850 would necessarily change thereby undesirably changing the preset operating clearance between the respective bearing regions 320, 860 of the annular rotary knife blade 300 and the split blade housing 800 set by the manufacturer. Accordingly, the extra securement of the split blade housing 800 in the first, blade supporting position 898 provided by the tightened fastener 950 advantageously mitigates this-possibility when significant cutting blade reaction forces are encountered during operation of the power operated rotary knife 100.

Power Operated Rotary Knife 100

Figure 10:
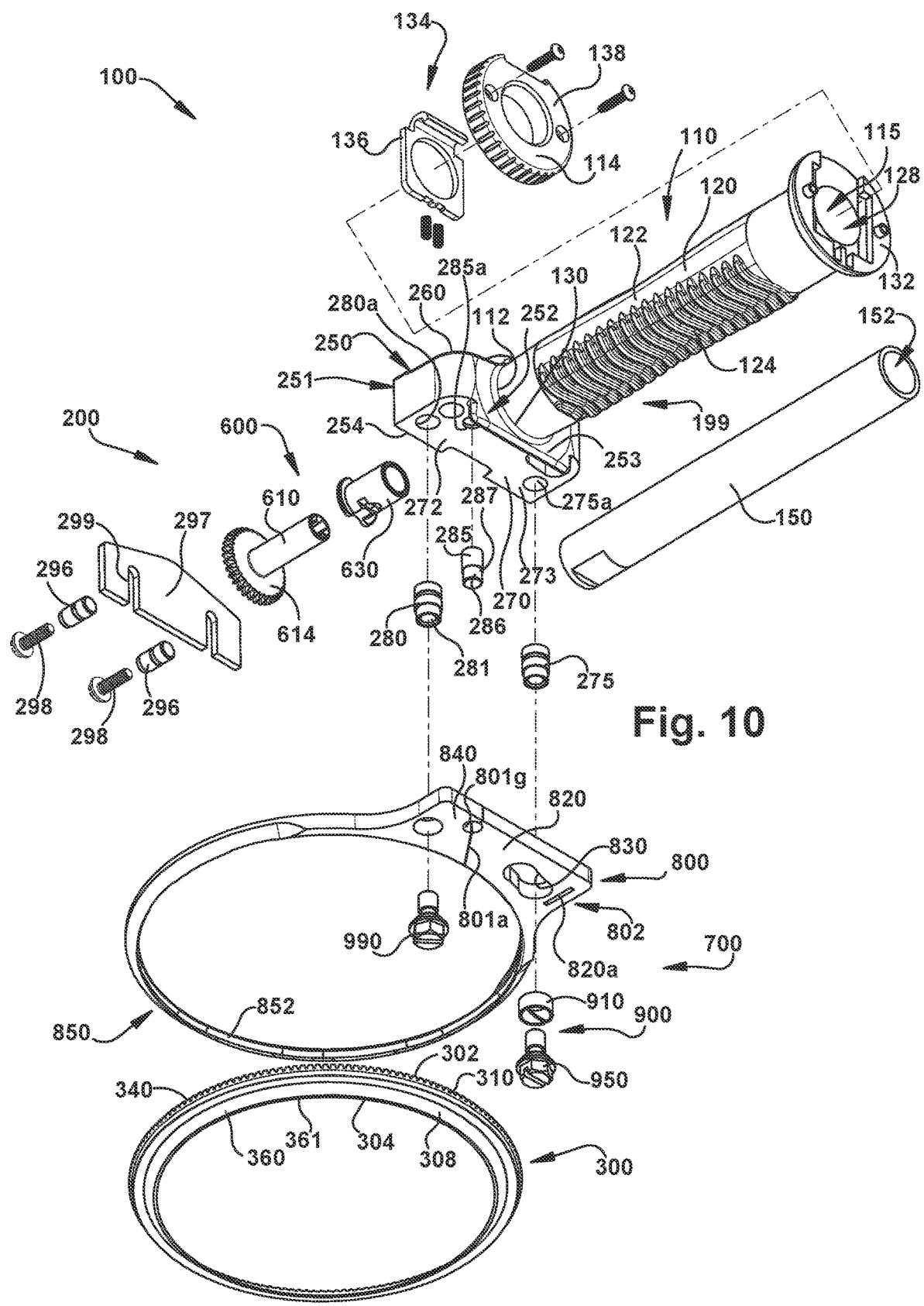
FIG. 10 is a schematic exploded, bottom, front perspective view of the power operated rotary knife of FIG. 1.

The power operated rotary knife 100 of the present disclosure extends between a distal or forward end 101 and a proximal or rearward end 102 of the power operated rotary knife 100. In one exemplary embodiment, the power operated rotary knife 100 includes the elongated handle assembly 110 including a central cylindrical core 150 overlied by a molded handle 120. The handle 120 extends between a distal end 130 and a proximal end 132 and includes a longitudinally extending through bore 128. The power operated rotary knife 100 further comprises the head assembly 200 including the frame body 250 extending from the distal end 112 of the handle assembly 110 and the drive mechanism 600, including a pinion gear 610 which engages and rotatably drives the annular rotary knife blade 300 about the blade central axis of rotation R. In one exemplary embodiment of the present disclosure, the handle 120 of the handle assembly 110 and the frame body 250 of the head assembly 200 are advantageously fabricated as an integral or one-piece molded component 199, which is molded over the central cylindrical core 150 of the handle assembly. The one-piece molded component 199 includes a number of advantages over the multiple component approach including lower cost of fabrication and easier assembly, disassembly and cleaning of the power operated rotary knife 100 due to a reduced number of parts. Additionally, the frame body mounting pedestal 272, which includes three inserts, namely, two threaded inserts 275, 280 and a third insert 285 having a portion 286 that protrudes downwardly from the seating surface 273 of the mounting pedestal 272 and comprises an axially extending post or boss 287, may be universally used for any number of sizes of blade-blade housing assembly combinations. As best seen in FIG. 10, the three inserts 275, 280, 285 are press fit into respective cylindrical openings 275a, 280a, 285a formed as recesses in the planar seating surface 273 defined by the mounting pedestal 272. The frame body mounting pedestal 272 may advantageously interchangeably support various diameter and styles of annular rotary knife blades, so long as all of the corresponding blade housing assemblies utilize the common three insert mounting configuration provided by the frame body mounting pedestal 272. As would be understood by one of skill in the art, the handle 120 of the handle assembly 110 and frame body 250 of the head assembly 200 could be fabricated a separate components and such configurations are within the scope of the present disclosure.

The handle assembly 110 includes a central throughbore 115 that extends along a central longitudinal axis LA of the handle assembly 110. The head assembly 200 extends from the handle assembly 110 along the central longitudinal axis LA in a forward or distal direction FW. The throughbore 115 of the handle assembly 110 receives a distal portion of a flexible drive shaft transmission assembly (not shown) which operatively engages and rotates the pinion gear 610 of the drive mechanism 600. Description of a flexible drive shaft transmission assembly is disclosed in U.S. Pat. No. 10,040,211 to Whited, issued on Aug. 7, 2018 and assigned to the assignee of the present application. As set forth above, the aforesaid U.S. Pat. No. 10,040,211 has been incorporated by reference or any all and purposes. As used herein, with regard to longitudinal directions, the forward direction FW will be a direction extending generally along or parallel to the handle assembly longitudinal axis toward the distal end 101 of the power operated rotary knife 100 and a rearward direction RW will be a direction extending generally along or parallel to the handle assembly longitudinal axis LA toward the proximal end 102 of the power operated rotary knife 100. As used herein, with regard to vertical axial directions, the upward direction UP will be a direction extending generally along or parallel to the annular rotary knife blade central axis of rotation R in the direction labeled UP in FIG. 5, while a downward direction DW will be a direction extending generally along or parallel to the annular rotary knife blade central axis of rotation R in the direction labeled DW in FIG. 5. As used herein, lateral shall mean a direction that is orthogonal to the forward and rearward directions FW, RW and orthogonal to the vertical or axial directions UP, DW. The lateral direction is labeled as LD in FIGS. 8, 11 and 23.

The head assembly includes the frame body 250, the drive mechanism 600, the annular rotary knife blade 300, and the blade housing assembly 700, including the split blade housing 800, which supports the annular rotary knife blade 300 for rotation about the blade central axis of rotation R. The annular rotary knife blade 300 includes an upper body 310 and the lower blade section 360 extending from the body 310. The annular rotary knife blade 300 is rotatably driven by the drive mechanism 600 and the forward portion 251 of the frame body 250 supports the drive mechanism 600 and positions a gear head 614 of the pinion gear 610 of the drive mechanism 600 to interface with a driven gear 340 of the body 310 of the rotary knife blade 300 to thereby rotate the blade 300 about its central axis of rotation R.

The assembled blade-blade housing combination 500 includes the blade-blade housing bearing structure 550 which includes two axially spaced apart bearing structures, namely, a first blade-blade housing bearing structure 560 and a second blade-blade housing bearing structure 570. An outer wall 318 of the body 310 of the annular rotary knife blade 300 includes the blade bearing region 320. The blade bearing region 320 defines a blade portion of the first and second blade-blade housing bearing structures 560, 570. The inner wall 852 of the blade support section 850 of the split blade housing 800 includes the blade housing bearing region 860. The blade housing bearing region defines a blade housing portion of the first and second blade-blade housing bearing structures 560, 570. Description of an annular rotary knife blade and split blade housing having first and second blade-blade housing bearing structures 560, 570 is disclosed in U.S. Pat. No. 10,040,211 to Whited which is assigned to the assignee of the present application. As set forth above, U.S. Pat. No. 10,040,211 has been incorporated by reference.

Handle Assembly 110

As best seen in FIGS. 1-6, 9-10 and 16-17, the handle assembly 110 extends longitudinally from the head assembly 200 in the rearward direction RW along the handle assembly central longitudinal axis LA. The handle assembly 110 includes the central through bore 115 that extends from and through a proximal end of the handle assembly 110 to the distal end 112 of the handle assembly 110. The through bore 115 is centered about the central longitudinal axis LA of the handle assembly 110. The handle assembly 110 includes a generally cylindrical central core 150 having a through bore 152 defines a portion of the through bore 115. The central core 152 supports the handle 120 which, in one exemplary embodiment, is molded around or is over molded about the central core 152. An outer surface 122 of the handle 120 includes a contoured handpiece 124 which is gripped by an operator of the power operated rotary knife 100 to manipulate the knife 100 for cutting and trimming operations. The proximal end 132 of the handle 120 defines a distal housing portion of a drive shaft latching assembly 134 of the handle assembly 110. The drive shaft latching assembly 134 includes a spring biased, movable latch 136 which functions to releasably secure a distal portion of the flexible shaft drive transmission assembly (not shown) in the handle assembly through bore 115 so that the drive fitting of the flexible shaft drive transmission assembly, when the distal portion is inserted into the through bore 115 and latched, operatively engages and rotates the pinion gear 610 about the pinion gear axis of rotation PGR. The drive shaft latching assembly 134 further includes a proximal housing portion 138 that interfits with the distal housing portion defined by the proximal end 132 of the handle 120 to support the latch 136. The proximal housing portion 138 defines a proximal end 114 of the handle assembly 110 and the proximal end 102 of the power operated rotary knife 100.

Frame Body 250

As best seen in FIGS. 1-7, 9-10 and 16-17, the frame body 250 includes the forward or distal portion 251, which supports the blade housing assembly 700, and the rearward or proximal portion 252, extending in the rearward direction RW toward the handle assembly 6110. In one exemplary embodiment, the handle 120 and frame body 250 are fabricated as a single molded component overlying the central core 150 of the handle assembly 110. The frame body 250 includes a through bore 290 which is aligned with and continues the central through bore 115 of the handle assembly 110 and extends along the handle assembly longitudinal axis LA. The forward portion 251 of the frame body 250 receives and removably supports both a pinion gear shield 297 and the blade-blade housing combination 500, including the expansion sleeve assembly 900 which is part of the blade housing assembly 700. The pinion gear shield 297 helps locate components of the drive mechanism 600 including the pinion gear 610 and a sleeve bushing 630, which support the pinion gear 610 for rotation about a pinion gear axis of rotation PGR. The axis of rotation PGR of the pinion gear 610 is substantially coincident with the handle assembly longitudinal axis LA. The frame body 250 positions the gear head 614 of the pinion gear 610 to be releasably and operatively coupled to the driven gear 340 of the body 310 of the annular rotary knife blade 300 of the assembled blade-blade housing combination 500 such that rotation of the pinion gear 610 about the pinion gear axis of rotation PGR rotates the annular rotary knife blade 300 with respect to the blade housing 800 about the blade central axis of rotation R, the central axis of rotation R intersecting and being substantially orthogonal to the pinion gear axis of rotation PGR.

The rearward portion 252 of the frame body 250 extends from the distal end 130 of the handle 120 and includes an axially downwardly extending finger guard 253 which extends below the lower portion of the contoured handpiece 124 of the handle 120. The forward portion 251 of the frame body 250 includes a front wall or front surface 254, an upper arcuate wall or surface 260, and a lower wall or lower surface 270. The lower surface 270 is generally planar and defines the generally planar mounting pedestal 272 for affixing the assembled blade-blade housing combination 500 to the frame body 250. The mounting pedestal 272, as mentioned previously, is configured to receive and support the three inserts, namely, the first and second threaded inserts 275, 280 and the third insert 285 which includes the axially extending boss 287 that protrudes below the mounting pedestal 272.

The axially extending boss 287 is received in a cylindrical opening 801g of the blade housing split 801a when the mounting section 802 of the split blade housing 800 is releasably affixed to the mounting pedestal 272 by the pair of threaded fasteners 950, 990 to advantageously provide a third point of securement for the blade housing mounting section 802, i.e., the two fasteners 950, 990 and interfitting of the boss 287 into the cylindrical opening 801g between the first and second portions 820, 840 of the split blade housing mounting section 802. As the first and second portions 820, 840 of the blade housing mounting section 802 are physically spaced apart by the blade housing split 801a, if only the two threaded fasteners 950, 990 were used to secure the first and second body portions 820, 840 to the frame body mounting pedestal 272, each portion 820, 840 would only be secured from sliding movement across the mounting pedestal 272 by a single point of securement (i.e., one of the fasteners). As discussed previously, if a bone or other hard material is encountered during cutting or trimming operations with the power operated rotary knife 100, high cutting reaction forces will be transmitted to the blade housing 800 and specifically the blade housing bearing region 860 of the blade support section 850 from the annular rotary knife blade 300. Depending on the angle and position of the cutting reaction force transmitted to the blade support section 850 of the split blade housing 800, a horizontal component of the force applied to the blade support section 850 could result in the application of a lateral torque force to the blade housing mounting section 802 that would result in a torque or twisting force to one or both of the two portions 820, 840 about its respective fastener 950, 990. By lateral torque force it is meant a force generally parallel to a planar extent of the mounting pedestal 272 and orthogonal to the blade axis of rotation R and the blade housing center line CBH. Such lateral torque forces would urge one or both of the first and second portions 820, 840 to pivot about its respective fastener 950, 990 and cause the first and second portions 820, 840 to slide across the mounting pedestal 272. However, with the interfitting of the boss 287 into the cylindrical opening 801g between the first and second portions 820, 840 of the split blade housing mounting section 802, each of the first and second portions 820, 840 effectively have two points of securement to absorb such lateral torque forces and thereby mitigate the tendency of the first and second portions 820, 840 to pivot about their respective fasteners 950, 990 and slide across the mounting pedestal 272.

The front wall 254 of the forward portion 251 of the frame body 250 defines a mounting surface that includes a pair of cylindrical openings 256 that receive respective ones of a pair of threaded mounting inserts 296. The pair of threaded mounting inserts 296 defines a pair of threaded openings 296a positioned on opposite sides of a forward cylindrical cavity 290a of the through bore 290. A pair of threaded fasteners 298 pass through respective slotted openings 299 in the pinion gear shield 297 to secure the pinion gear shield 297 to the front wall 254 of the frame body 250.

The planar lower surface 270 of the forward portion 251 of the frame body 250 defining the mounting pedestal 272 is substantially parallel to and offset below the handle assembly longitudinal axis LA. The threaded openings 276, 281 of the respective inserts 275, 280 and the boss 287 of the insert 285 are generally orthogonal in direction to the general extent of the lower surface 270 of the frame body 250. The frame body lower surface 270 includes the mounting pedestal 272 and the associated planar blade housing seating surface 273. Securing of the blade housing assembly 700 to the frame body 250 also secures the assembled blade-blade housing combination 500, including the rotary knife blade 300, to the frame body 250 and properly positions the rotary knife blade 300 to be rotatably driven about the central axis of rotation R by the pinion gear 610 of the drive mechanism 600 of the power operated rotary knife 100.

Figure 6:
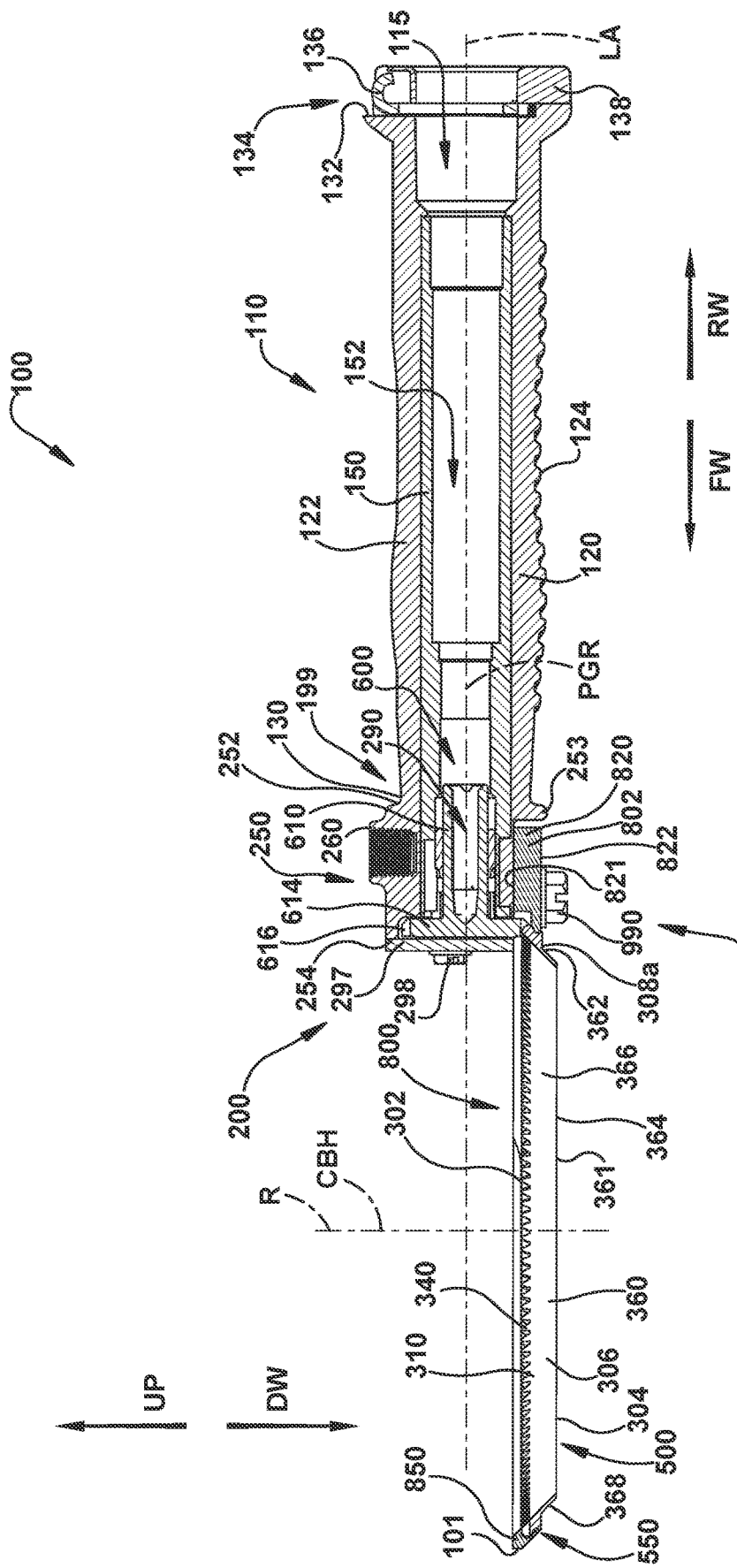
FIG. 6 is a schematic vertical section view taken along a longitudinal axis of the handle assembly of the power operated rotary knife of FIG. 1.
Figure 7:
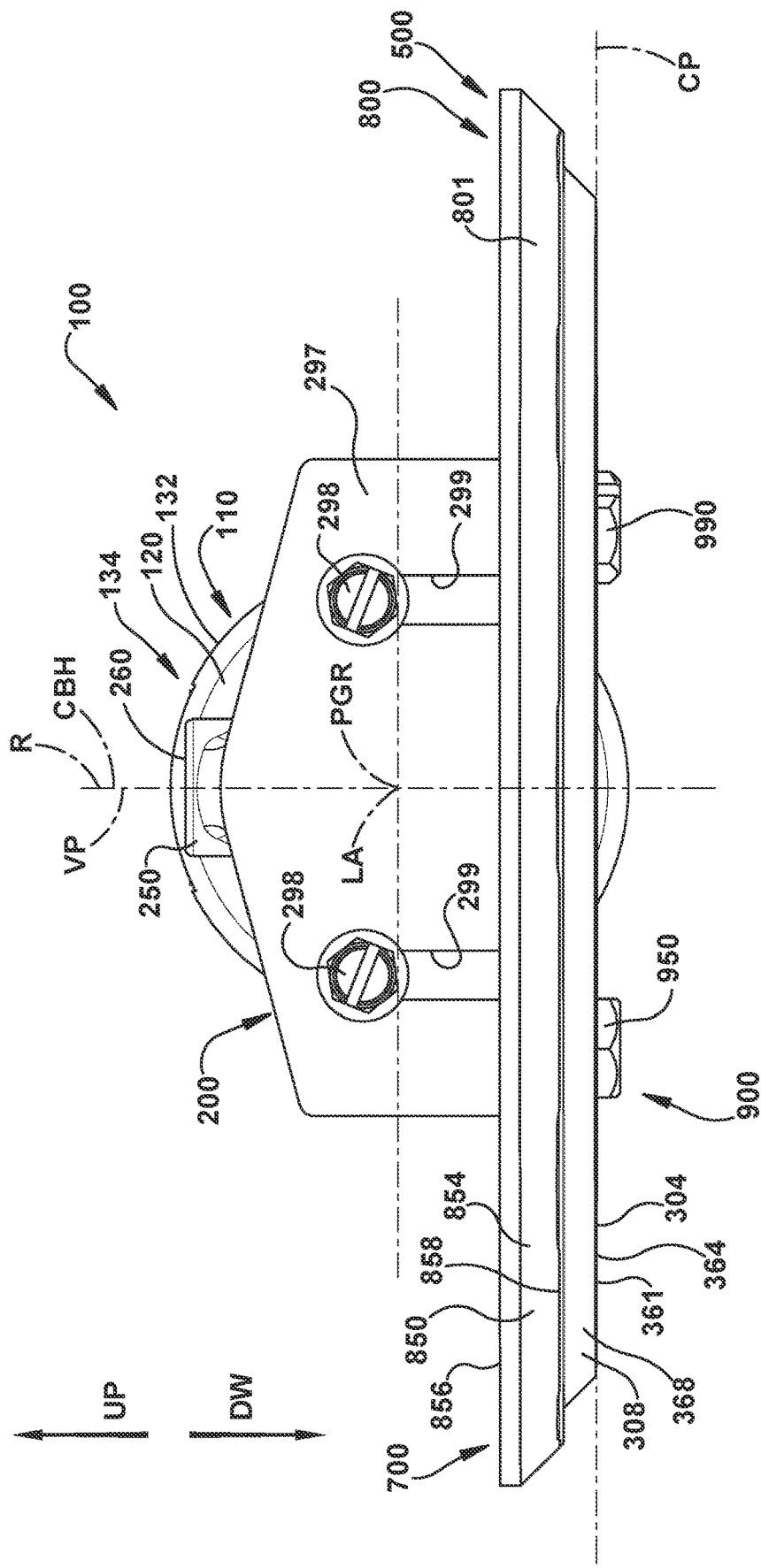
FIG. 7 is a schematic front elevation view of the power operated rotary knife of FIG. 1.
Figure 8:
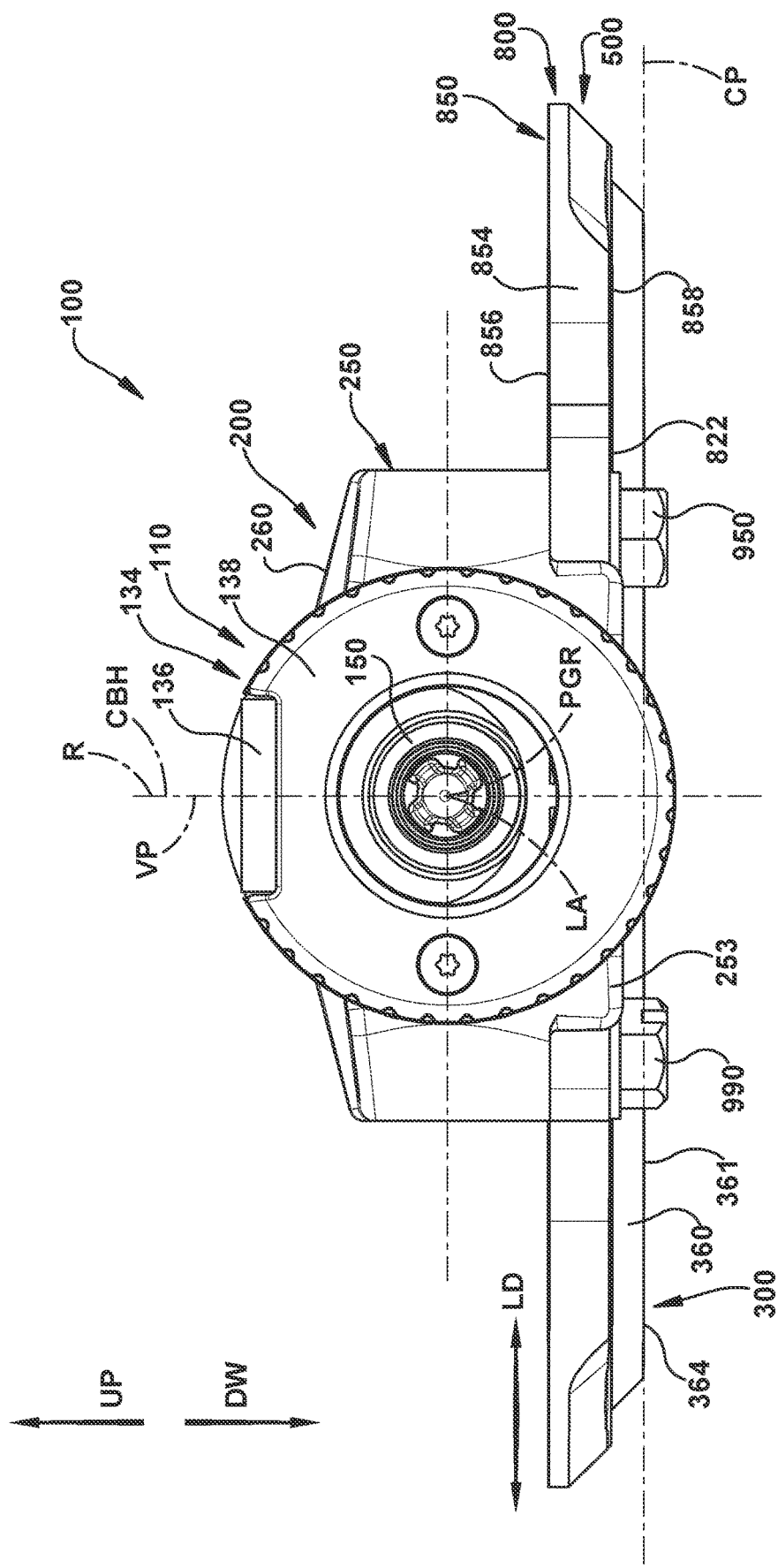
FIG. 8 is a schematic back elevation view of the power operated rotary knife of FIG. 1.
Figure 9:
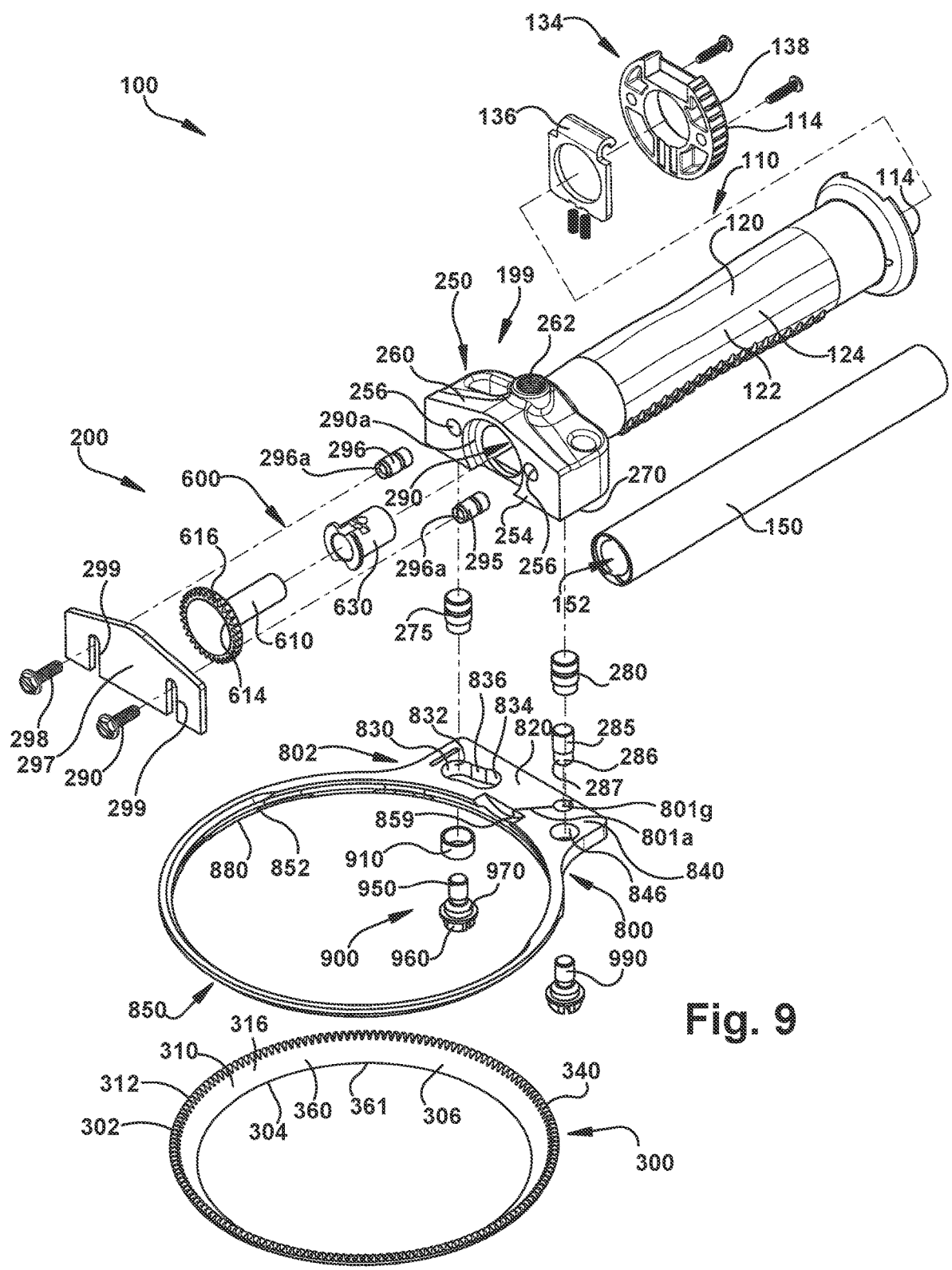
FIG. 9 is a schematic exploded, top, front perspective view of the power operated rotary knife of FIG. 1.

As can best be seen in FIGS. 6 and 9-10, the frame body through bore 290 receives and supports the drive mechanism 600 of the head assembly 200 of the power operated rotary knife 100. Specifically, the drive mechanism includes the sleeve bushing 630 which is received in the forward cylindrical cavity 290a of the through bore 290 in the forward portion 251 of the frame body 250. In turn, the pinion gear 610 of the drive mechanism 600 is rotatably supported by the sleeve bushing 630 such that the pinion gear 610, when driven by the drive fitting of the flexible shaft drive transmission assembly (not shown) rotates about the pinion gear axis of rotation PGR, which is substantially coincident with the handle assembly longitudinal axis LA. The gear head 614 of the pinion gear 610 is operatively connected to the rotary knife blade driven gear 340 such that a plurality of gear teeth 616 of the gear head 614 of the pinion gear 610 mesh with and rotationally drive a mating plurality of gear teeth 341 of the driven gear 340 of the rotary knife blade 300 to rotate the rotary knife blade 300 about its central axis of rotation R. The upper arcuate surface 260 of the forward portion 251 of the frame body includes a threaded fitting 262 that is adapted to receive a lubricant cup assembly (not shown) for the purpose of supplying lubricant to the pinion gear 610 and the blade-blade housing bearing structure 550. If no lubricant is desired, a threaded plug may be threaded into the threaded fitting 262.

Annular Rotary Knife Blade 300

As can best be seen in FIGS. 6,9-10 and 21, the annular rotary knife blade 300 is referred to as a flat blade style. Generally, differences in blade style (e.g., straight blade style, flat blade style, hook blade style and variations and combinations thereof) relate to the structure of the respective lower blade sections. While the exemplary rotary knife blade 300 of the present exemplary embodiment is a flat blade style rotary knife blade, numerous other blade styles, including, but not limited to, straight and hook style blades and combinations of blade styles may be utilized, with an appropriate blade housing assembly 700, in the power operated rotary knife 100 of the present disclosure, as would be understood by one of skill in the art. It is the intent of the present disclosure to cover all such rotary knife blade styles and sizes and the corresponding blade housings, that may be used in the power operated rotary knife 100. Description of other styles of annular rotary knife blades is disclosed in U.S. Pat. No. 10,040,211 to Whited, assigned to the assignee of the present application, as previously mentioned and incorporated by reference.

The annular rotary knife blade 300 of the power operated rotary knife 100 includes the annular upper body or body section 310 and the lower blade section 360 extending from the body 310. The rotary knife blade 300 is supported for rotation about the central axis of rotation R by the split blade housing 800 and the cutting edge 361 at a lower end of the blade section 360 defines the cutting plane CP (FIGS. 6, 7 and 20) of the rotary knife blade 300. The cutting plane CP is substantially orthogonal to the central axis of rotation R.

The annular rotary knife blade 300 includes an upper end or first end 302 and an axially spaced apart lower end or second end 304, defining the cutting edge 361 of the blade 300, and an inner wall 306 and a radially spaced apart outer wall 308. The blade section 360 of the rotary knife blade 300 includes an upper end 362, defined by a discontinuity or knee 308a in the outer wall 308 of the blade 200, and a lower end 364, which is coincident with the blade cutting edge 361, the cutting plane CP and the lower end 304 of the rotary knife blade 300. The blade section 360 also includes the inner wall 366 and the radially spaced apart outer wall 368.

Figure 20:
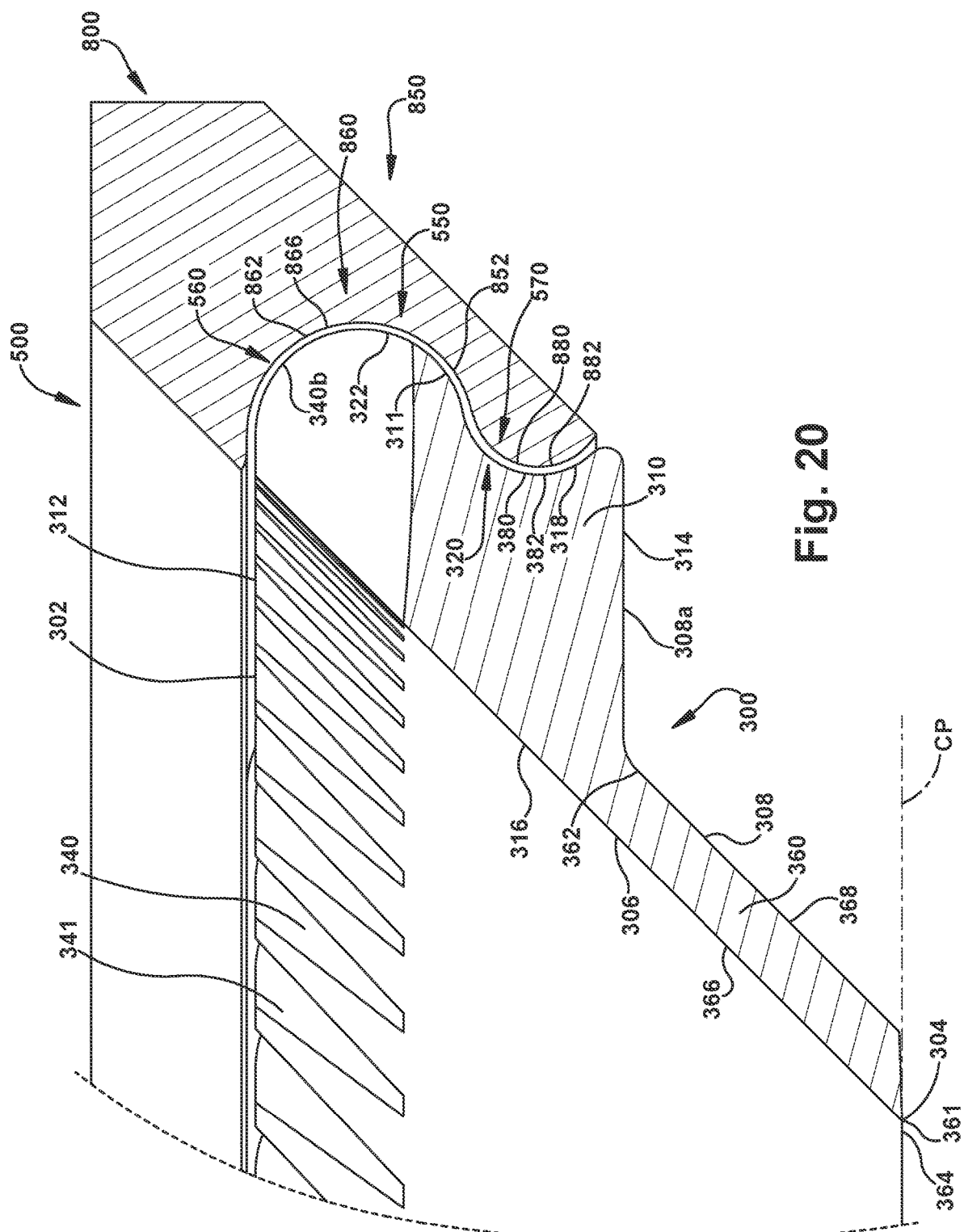
FIG. 20 is a schematic enlarged vertical section view of a portion of the annular rotary knife blade and annular split ring blade housing of the power operated rotary knife of FIG. 1 illustrating a blade-blade housing bearing structure.

As best seen in FIG. 20, turning to the annular body 310 of the annular rotary knife blade 300, the body 310 includes the driven gear 340 having a plurality of gear teeth 341. As best seen in FIG. 21, the body 310 includes an upper end 312 and an axially spaced apart lower end 314 and an inner wall 316 and a radially spaced apart outer wall 318. The bearing region 320 of the annular rotary knife blade 300 includes a first bearing surface 322 and an axially spaced second bearing surface 382. The first and second bearing surfaces 322, 382 are both part of the outer wall 318 of the annular rotary knife blade body 310. The first bearing surface 322 includes an upper bearing bead 311 of the body 310 and at least a portion of the first bearing surface 322 includes an outer surface 340b of the driven gear 340. The second bearing surface 382 includes a radially inwardly extending bearing race 380.

The assembled combination 500 of the rotary knife blade 300 and the annular split blade housing 800 comprises the blade-blade housing bearing structure 550 that includes the first blade-blade housing bearing structure 560 and the second blade-blade housing bearing structure 570. In the power operated rotary knife 100, the first blade-blade housing bearing structure 560 includes the first bearing surface 322 of the bearing region 320 of the rotary knife blade body 310 engaging and bearing against a first arcuate bearing surface 862 of the bearing region 860 of the blade support section 850 of the split blade housing 800. In one exemplary embodiment, the first arcuate bearing surface 862 is part of a bearing race 866 of the inner wall 852 of the blade support section 850 of the split blade housing 800. The second blade-blade housing bearing structure 570 of the power operated rotary knife 100 includes the second bearing surface 382 of the bearing region 320 of the rotary knife blade body 310 engaging and bearing against a second bearing surface 882 of the bearing region 860 of the blade support section 850 of the split blade housing 800. In one exemplary embodiment, the second bearing surface 882 is part of a bearing bead 880 of the inner wall 852 of the blade support section 850 of the split blade housing 800.

Blade Housing Assembly 700

The blade housing assembly 700 of the present disclosure functions to secure the rotary knife blade 300 for rotation about the central axis of rotation R and, as explained previously, includes a number of advantages including: a) holding the split blade housing 800 in the blade changing position 899 without the need for a constant external application of pressure to the first portion 820 of the blade housing mounting section 802; b) upon tightening of the fastener 950 when the split blade housing 800 is in the blade supporting position 898, provides for a "set it and forget it" mode of operation of the power operated rotary knife 100 avoiding operator adjustment of blade housing diameter for purposes of adjusting operating or running clearance; and c) provides a configuration of the split 801a that includes the cylindrical opening 801g sized to receive the boss 287 of the mounting pedestal 272 of the frame body 250 to provide a third point of securement for the blade housing mounting section 802 to the frame body mounting pedestal 272 and thereby mitigate the tendency of the first and second portions 820, 840 to pivot about their respective fasteners 950, 990 and slide across the mounting pedestal 272 under high cutting reaction force conditions.

As best seen in FIGS. 8-15, 18-19 and 21-29, the blade housing assembly 700 includes the split blade housing 800 and the expansion sleeve assembly 900. The split lock sleeve 910 of the expansion sleeve assembly 900, in its first, uncompressed condition 998 (FIGS. 21-24) maintains the split blade housing 800 in a selected one of the first blade supporting position 898 of the first body portion 820 of the blade housing mounting section 802 and the second blade changing position 899 of the first body portion 820. When moving between the first blade support position 898 and the second blade changing position 899, the first body portion 820 is moved with respect to the second body portion 840 and the first body portion 820 is in the third, intermediate position 890. This necessitates a compression of the split lock sleeve 910 as the sleeve 910, which is stationary, passes through the central passageway 836 of the axial slot 810 of the first body portion 820. As can best be seen in FIGS. 25 and 26, in the third, intermediate position 890 of the first body portion 820, the split lock sleeve 910 is in the second, compressed condition 999 of the split lock sleeve 910.

In comparing the first blade supporting position 898 and the second blade changing position 899 of the split blade housing 800, the blade housing 800 may be characterized by two dimensions: a) the blade housing split distances D1, D2 (FIGS. 29 and 24, respectively) at the inner wall 852 of the blade support section 850 which are measured laterally (that is, in a direction generally orthogonal to the handle assembly longitudinal axis LA) across the split 801a at the inner wall 852 and parallel to the cutting plane CP of the rotary knife blade 300; and b) blade housing diameters BHD1, BHD2 (FIGS. 21 and 23, respectively), which are measured laterally with respect to the outer diameter of the annular blade support section 850, the second blade housing diameter BHD2 being larger than the first blade housing diameter BHD1 to facilitate removal of the annular rotary knife blade 300 from the split blade housing 800 when the blade housing 800 is in the second, blade changing position 899. Split distance D1 corresponds to the first blade supporting position 898 of the first body portion 820, while split distance D2, which is greater than split distance D1, corresponds to the second blade changing position 899 of the first body portion 820).

The blade housing split distances D1, D2 for a particular blade housing, of course, will vary depending, among other things, on the position and length of the axial slot 800 of the first portion 820 of the mounting section 802. The blade housing split distances D1, D2 are measured between circumferentially spaced apart ends 852a, 852b of the inner wall 852 of the blade support section 850 of the blade housing 800 adjacent the split 801a. In one exemplary embodiment, the blade housing split distance D1 corresponding to the first, blade supporting position 898 of the blade housing 800 is approximately 0.01 in., while the blade housing split distance D2 corresponding to the second, blade changing position 899 of the blade housing 800 is approximately 0.41 in. In one exemplary embodiment, the blade housing outer diameter BHD1 (FIG. 21) corresponding to the first, blade supporting position 898 of the blade housing 800 is approximately 5.31 in., while the blade housing outer diameter BHD2 (FIG. 23) corresponding to the second, blade changing position 899 of the blade housing is approximately 5.45 in. It being understood, of course, that the dimensions of the split blade housing 800 and the expansion sleeve assembly 900 and the required blade housing split distances D1, D2 and blade housing diameters BHD1, BHD2 will necessarily change based on a number of parameters of the power operated rotary knife 100 including: a) the diameter or size of the rotary knife blade to be supported by the blade housing; b) the dimensions and configuration of the blade-blade housing bearing structure; and c) the specific style, configuration, dimensions, characteristics and parameters of the rotary knife blade and/or the blade housing and/or other components of the power operated rotary knife 100. The dimensions set forth herein are merely illustrative or representative of one exemplary embodiment of the blade-blade housing combination 500 and the power operated rotary knife 100.

The bearing interface between the blade bearing region 320 of the annular rotary knife blade 300 and the blade housing bearing region 860 of the blade support section 850 of the split blade housing 800 together comprise the blade-blade housing structure 550 of the power operated rotary knife 100. The blade-blade housing structure 550 supports the blade 300 for rotation about its central axis of rotation R. When the blade housing diameter moves from the first, unexpanded blade housing diameter BHD1 to the second, expanded blade housing diameter BHD2, a diameter of a bearing region 860 of the blade support section 850 of the blade housing 800 expands proportionately with the outer diameter of the blade housing 800 as the diameter changes from BHD1 to BHD2, thus, the diameter of the bearing region 860 of the blade support section 850 of the blade housing 800 expands sufficiently to allow removal of the annular rotary knife blade 300 from the blade support section 850 of the split blade housing 800. Stated another way, since the diameter of the bearing region 860 of the blade support region 850 of the blade housing 800 is directly proportional to the outer diameters BHD1, BHD2 of the blade support section 850, the blade housing outer diameters BHD1, BHD2 may be used as a convenient surrogate for the respective first, unexpanded diameter and second, expanded diameter of the blade housing bearing region 860 as the blade housing 800 moves from the first, blade supporting position 898a to the second, open or expanded blade changing position 899a. Thus, for the specific parameters of the bearing interface or structure 550 between the respective diameters of blade and blade housing bearing regions 320, 860, the second blade housing diameter BHD2 is sized to be a magnitude that is sufficiently large such that the annular rotary knife blade 300 drops downwardly out of or is easily removed from the blade housing blade support section 850 when the blade housing 800 has been moved to the second, blade changing position 899.

Advantageously, the axial slot 830 of the first body portion 830 is easy to manufacture and is scalable to account for differing sizes and styles of annular rotary knife blades. That is, if a delta or change in blade housing diameter between the blade support and blade changing positions 898, 899 (that is, BHD2-BHD1) is required for removing an annular rotary knife blade that has a larger diameter, a length or extent of the axial slot 830 along its central axis SCA (FIG. 11) may be increased to any desired length when fabricating the split blade housing 800 to account for the larger required delta for the intended knife blade(s) the power operated rotary knife 100 and blade housing 800 are designed to receive. The axial slot 830, extending through a thickness of the first body portion 820 of the blade housing mounting section 802, is relatively easy to manufacture to desired dimensions and tolerances.

Advantageously, with the expansion sleeve assembly 900 of the present disclosure, accommodation of differing sizes and styles of annular rotary knife blades does not require that either: a) the expansion sleeve assembly 900; or b) the mounting pedestal 272 of the frame body 250 be changed for differing sizes and styles of blades. The locations of the first and second fasteners 950, 990 and the split lock sleeve 910 with respect to the frame body mounting pedestal 272 are fixed, as are the locations of the corresponding inserts 275, 280, 285 of the mounting pedestal 272 of the frame body 250. Thus, a single, universal frame body 250 and expansion sleeve assembly 900 assembly can advantageously be utilized as a common platform for receiving and securing a variety of different split blade housings having: a) differing lengths of the axial slot 830; and b) different diameters and styles of blade support sections 850, as required for supporting different diameters and styles of annular rotary knife blades 300 envisioned to be used with the power operated rotary knife 100. Moreover, the split lock sleeve 910 of the present disclosure is relatively inexpensive to manufacture with repeatability of dimensions. Additionally and advantageously, the blade housing assembly 700, including the expansion sleeve assembly 900, of the present disclosure has fewer components than, for example, the blade housing assemblies disclosure in previously referenced and incorporated U.S. Pat. No. 10,124,500 to Whited et al. and U.S. Pub. No. US 2018/0345514 A1 to Whited et al., both of which disclose a cam mechanism to move a split blade housing between a blade supporting position and a blade changing position. Less components, in addition to reducing manufacturing cost, result in a power operated rotary knife that is easier for a customer to maintain and periodically clean. Additionally, there are fewer "blind" openings or recess to clean in the one-piece molded handle and frame body 199 and the housing blade housing assembly 700 of the present disclosure, which provides for less maintenance and easier and efficacious cleaning of the power operated rotary knife 100.

Split Blade Housing 800

As can best be seen in FIGS. 9-15, the annular split ring blade housing or split blade housing 800 comprises the annular split ring 801 including the split 801a that extends through the annular blade support section 850 and the mounting section 802. The split blade housing 800 includes an inner wall 800a and a radially spaced apart outer wall 800b and an upper end or surface 800c and an axially spaced apart lower end or surface 800d. The split 801a extending generally radially through the blade housing outer wall 800b and the blade housing inner wall 800a and through the upper and lower ends 800c, 800d of the blade housing 800. The split 801a allows for expansion of a circumference of the annular blade support section 850 for purposes of removing the annular rotary knife blade 300 from the annular blade support section 850 and inserting a new or resharpened annular rotary knife blade 300 into the annular blade support section 850. The upper end or surface 800c of the blade housing 800, which includes respective upper surfaces 808, 856 of both the radially extending mounting section 802 and the annular blade support section 850, is generally planar. Similarly, the lower end or surface 800d of the blade housing 800, which includes respective lower surfaces 810, 858 of both the mounting section 802 and the annular blade support section 850, is generally planar.

As can best be seen in FIGS. 11-14, the mounting section 802 extends radially from the annular blade support section 850 and includes a planar central region 811. The mounting section 802 of the split blade housing 800 includes the inner wall 804, which overlaps and is coincident with the inner wall 852 of the blade support section 850 and comprises and corresponds to a portion of the inner wall 800a of the blade housing 800, and a radially spaced apart outer wall 806, which defines a portion of the outer wall 800b of the blade housing 800. The mounting section 802 further includes the upper end or surface 808, which defines a portion of the upper end or surface 800c of the blade housing 800, and the axially spaced apart lower end 810, which defines a portion of the lower end or surface 800d of the blade housing 800. The upper end 808 of the mounting section 802 is generally planar. The upper surface 856 of the blade support section 850 and the upper surface 808 of the mounting section 802 are advantageously coplanar with and together form the generally planar upper surface 800c of the blade housing 800. The split 801a bisects the planar central region 811 of the mounting section 802 defining the first portion or first body portion 820 on one side of the split 801a and the second portion or second body portion 840 on an opposite sides of the split 801a. The first body portion 820 includes an upper surface 821 and an axially spaced apart lower surface 822 and an inner surface 823, which is a part of the inner wall 804 of the blade housing mounting section 804, and a radially spaced apart outer surface 824, which is a part of the outer wall 806 of the blade housing mounting section 804. The second body portion 840 includes and upper surface 841 and an axially spaced apart lower surface 842 and an inner surface 843, which is part of the inner wall 804 of the blade housing mounting section 804, and a radially spaced apart outer surface 844, which is part of the outer wall 806 of the blade housing mounting section 802.

The first body portion 820 of the blade housing mounting section 802 includes the axially extending slot 830 that passes through the upper and lower surfaces 821, 822 of the first body portion 820. The slot 830, when viewed in plan view, has a generally dog-bone shaped with the first and second enlarged end portions 832, 834 connected by the narrower central passageway 836. The axially extending slot 830 is defined by a vertical wall 837 and includes four wall portions: a) first and second opposing or facing wall portions 837a, 837b that comprise the central passageway 836; and b) first and second wall portions 837c, 837d that comprise the first and second enlarged ends 832, 834, respectively. The split lock sleeve 910 of the expansion sleeve assembly 900 is received in the axial slot 830 and the first threaded fastener 950 of the expansion sleeve assembly 900, in turn, extends through the through bore or central opening 920 of the split lock sleeve 910 that threads into the threaded opening 276 of the cylindrical insert 275 of the frame body mounting pedestal 272 to secure the first body portion 820 to the mounting pedestal 272. The second body portion 840 includes an axially extending, cylindrical opening 846 which extends through the upper and lower surfaces 841, 842 of the second body portion 840. The cylindrical opening 846 is sized to receive the second threaded fastener 990 of the expansion sleeve assembly 900. The second threaded fastener 990 threads into the threaded opening 281 of the cylindrical insert 280 of the frame body mounting pedestal 272 to secure the second body portion 840 to the mounting pedestal 272. In addition to the vertically extending blade housing center line CBH which defines a center of the blade support section 850 of the split blade housing 800, the blade housing 800 may also be characterized by a longitudinally extending blade housing vertical plane VP (FIGS. 3-4, 7-8 and 11-12) that extends along and is substantially coincident with both the handle assembly longitudinal axis LA and the blade housing center line CBH, that is, the blade housing vertical plane VP is a plane that intersects and includes both the handle assembly longitudinal axis LA and the blade housing center line CBH.

Figure 11:
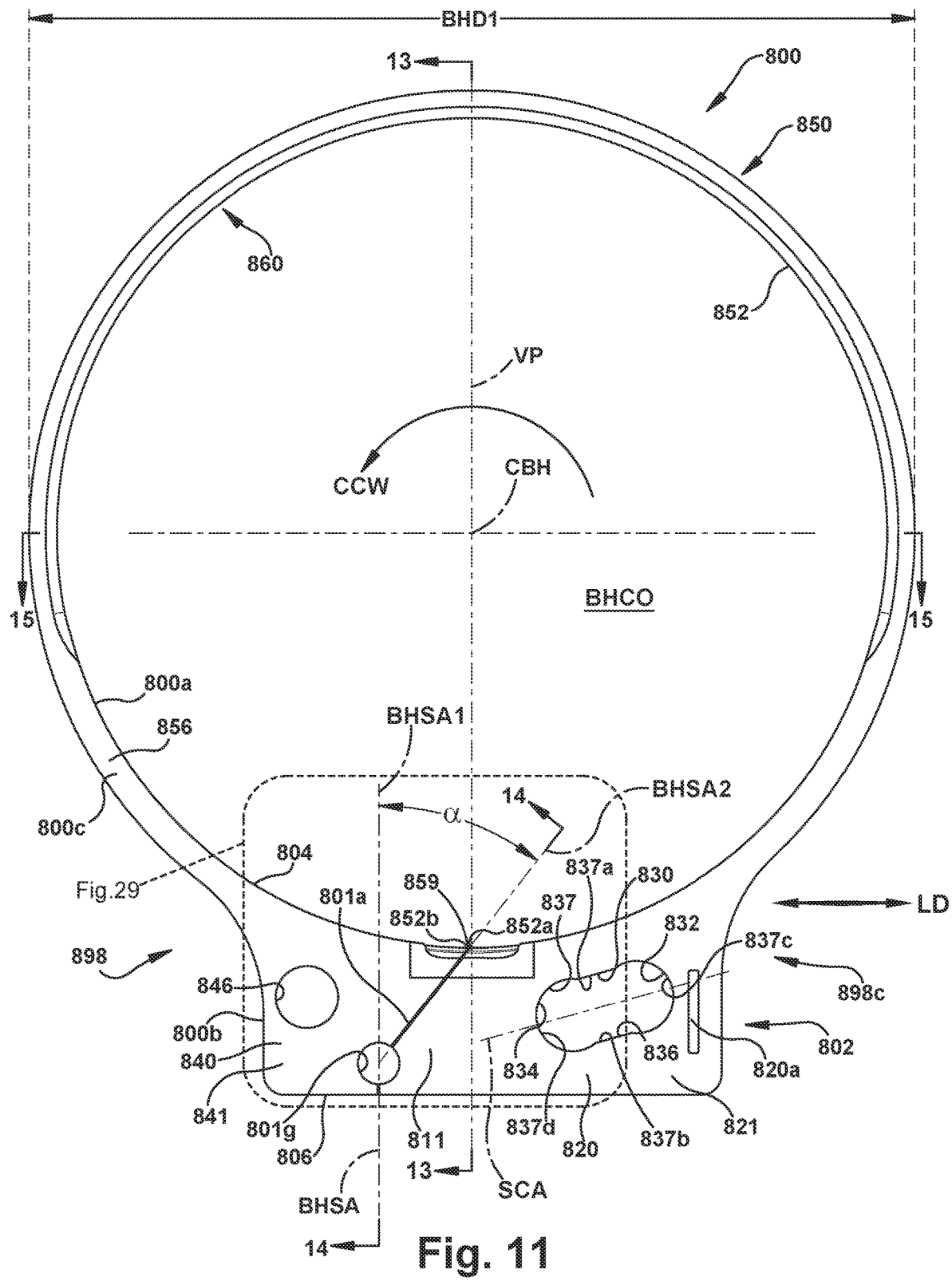
FIG. 11 is a schematic top plan view of the annular split ring blade housing of the blade housing assembly of power operated rotary knife of FIG. 1.
Figure 12:
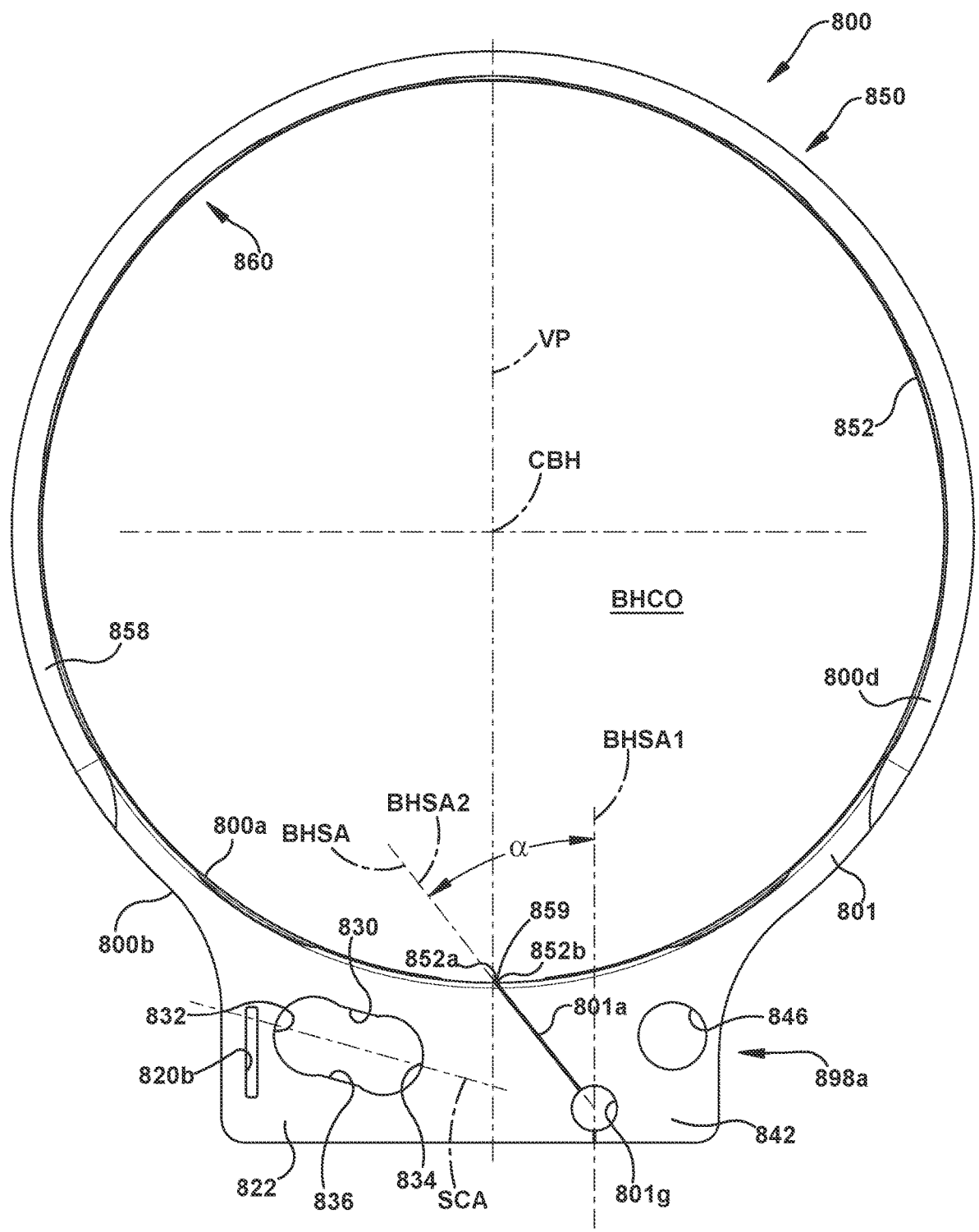
FIG. 12 is a schematic bottom plan view of the annular split ring blade housing of FIG. 11.
Figure 17:
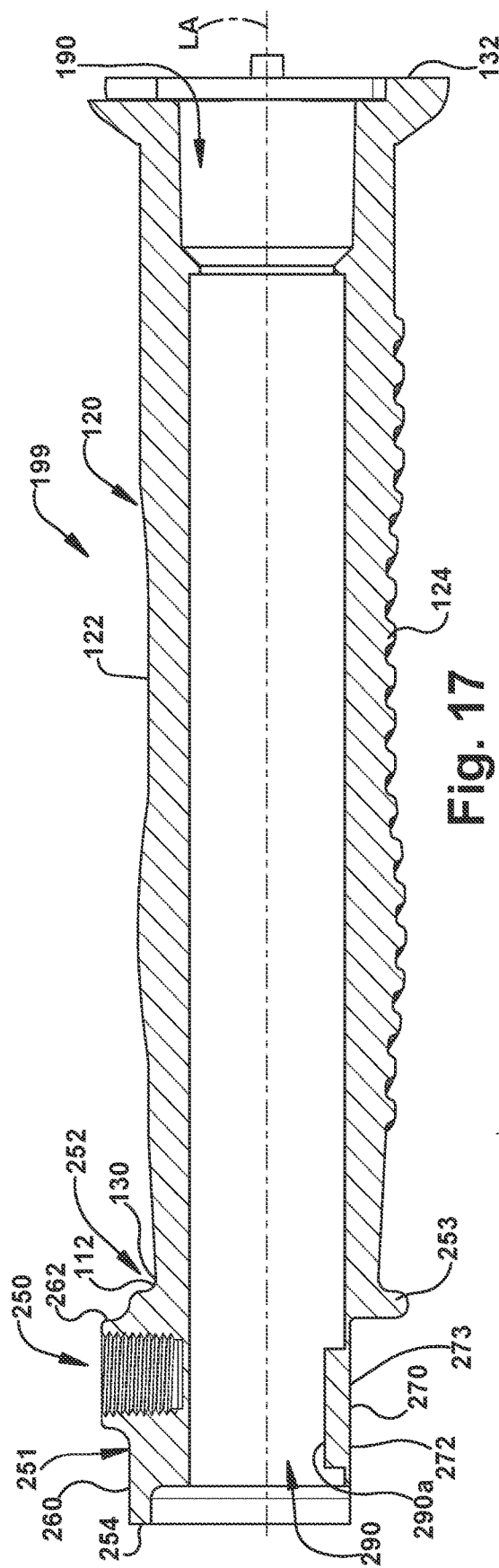
FIG. 17 is a schematic vertical section view of the one-piece, molded handle and frame body of FIG. 16.

As best seen in. FIGS. 11, 13 and 15, an arcuate recess 815 is formed in the planar upper surface 808 of the mounting section 802 adjacent the inner wall 804. The first arcuate recess 815 provides clearance for the gear head 614 of the pinion gear 610 when the pinion gear head 614 is positioned to engage the mating driven gear 340 of the rotary knife blade 300. As can best be seen in FIGS. 13-15, the first arcuate recess 815 circumferentially interrupts an upper portion of the bearing race 866 which includes the arcuate first bearing surface 862 of the bearing region 860 of the blade housing blade support section 850. However, the first arcuate recess 815 is axially spaced above the bearing bead 880 comprising the second bearing surface 882 of the bearing region 860 of the blade housing blade support section 850 and, therefore, the bearing bead 880 is not interrupted in the region of the first arcuate recess 815. The arcuate recess 815 is bisected by the blade housing split 801a which extends through the inner wall 804 of the blade housing mounting section 802 in the region of the first arcuate recess 845.

The lower surface 810 of the mounting section 802 and the lower surface 858 of the blade support section 850 are advantageously coplanar with and together form the generally planar lower surface 800d of the blade housing 800. That is, the upper and lower surfaces 800c, 800d of the blade housing 800 define generally parallel planes providing the blade housing with a smooth profile having substantially parallel upper and lower planar surfaces and uniform axial thickness in both the blade support section 850 and the mounting section 802 of the blade housing 800.

The mounting section 802 overlaps and extends radially outwardly from the blade support section 850 and defines a generally planar mounting platform 803 which is secured to the planar mounting pedestal 272 defined by the lower surface 270 of the forward portion 251 of the frame body 250 by the pair of fasteners 950, 990 of the expansion sleeve assembly 900. In one exemplary embodiment, the fasteners 950, 990 are threaded fasteners which thread into respective inserts 275, 280 having threaded openings 276, 281. Given that, in one exemplary embodiment, the mounting pedestal 272 is a part of the molded one-piece handle and frame body 199, the threaded inserts 275, 280 are press fit into respective cylindrical openings 275a, 280a (seen in FIG. 10) formed during the molding process in the downward facing seating surface 272 of the mounting pedestal 272. Similarly, the insert 285, which includes the axially extending boss 287 protruding from the seating surface 272, is press fit into a cylindrical opening 285a formed during the molding process in the downward facing seating surface 272 of the mounting pedestal 272.

The mounting section 802 of the split blade housing 800 is releasably secured to the seating surface 272 of the mounting pedestal 272. First, as the threaded fastener 990 is tightened into the threaded opening 281 of the insert 280, a radially extending flange 994 of an enlarged head 992 of the fastener 990 bears against the lower surface 842 of the mounting section second body portion 840 to secure the second body portion 840 to the planar mounting pedestal 272 of the frame body 270. In the first, blade supporting position 889 of the split blade housing 800 (which is the natural condition of the split blade housing 800), the axially extending boss 287 is received in the cylindrical opening 801g of the split 801a of the blade housing mounting section 802. Second, as the threaded fastener 950 passes through the central opening 920 of the split lock sleeve 910 and is tightened into the threaded opening 276 of the insert 275, the inclined shoulder 970 of the enlarged head 960 bears against the first end 914 of the split lock sleeve 910 to maintain the sleeve 910 in the first uncompressed condition 998 of the sleeve in the first enlarged end portion 832 of the axial slot 830 of the mounting section first body portion 820 and the radially extending flange 980 of the enlarged head 960 of the fastener 960 bears against the lower surface 822 of the mounting section first body portion 820 to secure the first body portion 840 to the planar mounting pedestal 272 of the frame body 270.

The blade support section 850 includes an inner wall 852, which comprises and corresponds to the inner wall 800a of the blade housing 800, and a radially spaced apart outer wall 854, which defines a portion of the outer wall 800b of the blade housing 800, and the upper end or surface 856, which defines a portion of the upper end 800c of the blade housing 800, and the axially spaced apart lower end 858, which defines a portion of the lower end 800d of the blade housing

800. The annular blade support section 850 supports the annular rotary knife blade 300 for rotation about the blade central axis of rotation R.

As can best be seen in FIGS. 13-14 and 21, the inner wall 852 of the blade support section 850 defines the bearing region 860 of the blade housing 800. The bearing region 860 of the blade support section 850 includes the bearing race 866 comprising the arcuate first bearing surface 862 and the bearing bead 880 comprising a second bearing surface 882 of the bearing region 860. As explained previously, the bearing region 860 of the blade housing 800 engages the bearing region 320 of the body 310 of the rotary knife blade 300 to support the blade 300 for rotation about the central axis of rotation R. In one exemplary embodiment, the bearing bead 880 is discontinuous circumferentially around the inner wall 852 of the blade support section 852, being interrupted by radially recessed regions 880a (FIG. 13) of the bead 880. The radially recessed regions 880a of the bearing bead 880 do not engage the corresponding bearing race 380 of the annular rotary knife blade bearing region 320. In one exemplary embodiment of the bearing bead 880, there are nine circumferentially extending bearing bead segments separated by nine radially recessed regions 880a. As best seen in FIG. 15, a bearing bead segment of the bearing bead 880 in the region of the first arcuate pinion gear recess 815 is bisected by the blade housing split 801a resulting in two bearing bead segments 880b, 880c disposed on opposite sides of the blade housing split 801a. The inner wall 852 of the blade support section 850 defines a blade housing central opening BHCO (FIGS. 11 and 12) and is centered about and defines the blade housing center line CBH. The blade housing center line CBH, in the first, blade supporting position 898 of the blade housing 800, is substantially coincident with the blade central axis of rotation R. A circumference defined by the outer wall 854 of the blade support section 850 plus the split width or split distance D1 results in the blade housing diameter BHD1 in the first, blade supporting position 898 of the blade housing 800, while a circumference defined by the outer wall 854 plus the split width or split distance D2 results in the blade housing diameter BHD2 in the second, blade changing position 899 of the blade housing 800. In the second, blade changing position 899 of the blade housing 800, the inner wall 852 of the blade support section 850 takes on a very slight oval or egg-shaped configuration because of the larger split width D2.

The radially extending split 801a defines a radially extending split axis BHSA of the blade housing mounting section 802. As best seen in FIGS. 11-12, 14, 21-22 and 29, the blade housing split 801a extends through both the annular blade support section 850 and the mounting section 802 extending from the blade support section 850. In reality, the blade housing split axis BHSA is a plane (as opposed to a line) that extends along and is centered between opposing faces 825, 845 of the first and second body portions 820, 840 of the blade housing mounting section 802. However, for sake of simplicity, the blade housing split plane will be referred to the blade housing split axis BHSA. In one exemplary embodiment, the split 801a includes the two, intersecting, non-parallel first and second split portions 801b, 801c that essentially form, when viewed in plan view, a dog-leg shaped split. The split 801a includes the first, rearward extending split portion 801b, the second, forward extending angled split portion 801c, and the axially extending cylindrical opening 801g which is intermediate between or bridges the first, rearward split portion 801b and the second, forward angled split portion 801c. The first, rearward extending split portion 801b includes a proximal end 801d and a distal end 801e and extends substantially parallel to, but offset from, the handle assembly longitudinal axis LA and the blade housing vertical plane VP. The second, forward extending angled split portion 801c includes a proximal end 801h and a distal end 801i. The distal end 801i of the second angled split portion 801c defines an intersection or termination position or location 801j which represents a termination of the split 801a at the blade support section inner wall 852.

The first, rearward extending split portion 801b extends along a first linear blade split axis BHSA1, which defines part of the blade housing split axis BHSA, and the second, forward extending angled split portion 801c extends along a second angled linear split axis BHSA2, which also defines part of the blade housing split axis BHSA. A direction of the second, forward extending split 801c, which extends along the second angled split axis BHSA2 is offset from, that is, would not intersect, the blade housing center line CBH. Similarly, a direction of the first, rearward extending split 801b, which extends along the first split axis BHSA1 is also offset from, that is, would not intersect, the blade housing center line CBH. The termination location 801j of the second, forward angled split 801c at the blade support section inner wall 852 intersects the blade housing vertical plane VP. The blade housing vertical plane VP also bisects the pinion gear recess 815 of the upper surface 808 of the mounting section 802 and the second, forward angled split portion 801c extends through the pinion gear recess 815 at the acute angle alpha α with respect to the vertical plane VP. The acute angle alpha α is also the acute angle formed between the first split axis BHSA1 and the second split axis BHSA2 since the first split axis BHSA1 of the first, rearward split portion 801b and the blade housing vertical plane VP are substantially parallel. Having the second, forward extending angled split 801c passes through the blade support section inner wall 852 at the acute angle alpha α is advantageous. The annular rotary knife blade 300, when viewed in top plan view (FIG. 11), rotates in a counterclockwise direction CCW about the axis of rotation R. A component of the second split axis BHSA2 in the lateral direction LD is, therefore, in the same lateral direction as a component of counterclockwise direction of rotation CCW of the blade 300 in the lateral direction LD at the termination location 801j. This common lateral directionality of the second, forward extending angle split 801c and the counterclockwise direction of rotation CCW of the rotary knife blade 300 tends to mitigate the potential build-up or collection of cutting and trimming debris such as pieces of fat, gristle and the like generated during meat cutting and trimming operations in the region of the termination location 801j of the split 801a at the blade support section inner wall 852.

The first split portion 801a is adjacent to and extends through an outer wall 806 of the mounting section 802, while the second split portion 801c is adjacent to and extends through the inner wall 852 of the blade support section 850 and an inner wall 804 of the mounting section 802. Specifically, the proximal end 801d of the first split portion 801b extends through the outer wall 806 of the mounting section 802 and the distal end 801i of the second split portion 801c extends through the inner wall 852 of the blade support section 850. Since the inner wall 804 of the mounting section 802 overlies and is coincident with the inner wall 852 of the blade support section 850 in the region of the mounting section 802, the distal end 801i of the second split portion 801b similarly extends through the inner wall 804 of the mounting section 802.

Figure 29:
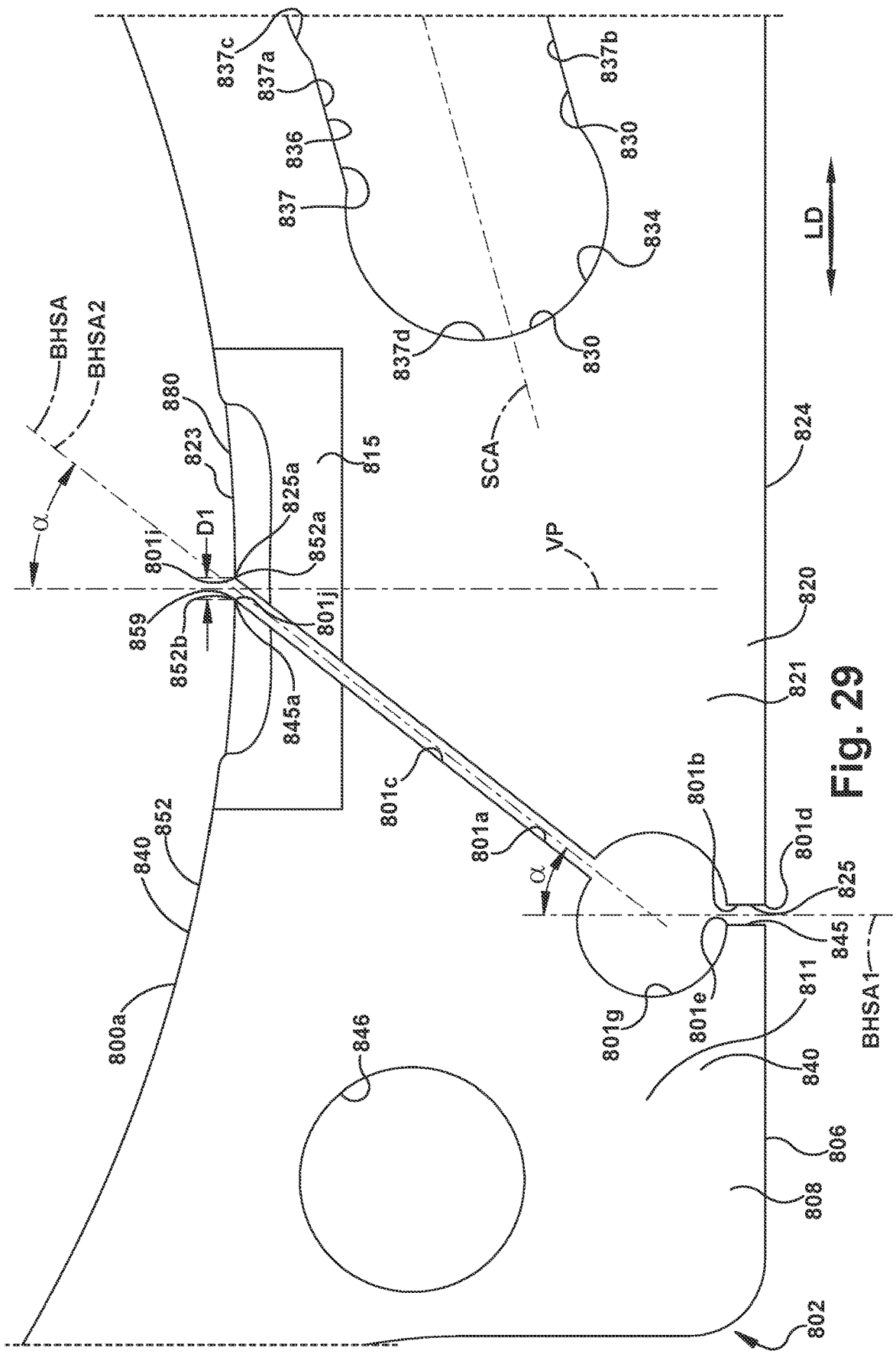
FIG. 29 is a schematic enlarged top plan view of a portion of the annular split ring blade housing shown in FIG. 11 that is within a dashed line labeled FIG. 29.

A distal end 801e of the first split portion 801b and the proximal end 801h of the second angled split portion 801c terminate at and intersect the axially extending cylindrical opening 801g. As previously described, when the first portion 820 of the split blade housing 800 is in the blade supporting position 898, the axially extending cylindrical opening 801g snugly receives the protruding boss 287 of the insert 285 of the frame body mounting pedestal 272. The engagement of the mounting pedestal boss 287 and the cylindrical opening 801g of the first body portion 840, along with fasteners 950, 990 of the expansion sleeve assembly 900 which thread into respective threaded inserts 275, 280 of the frame body mounting pedestal 272 advantageously provide a three point of securement for the blade housing mounting section 802 to the mounting pedestal 272 to mitigate the tendency of the first and second portions 820, 840 to pivot about their respective fasteners 950, 990 and slide across the mounting pedestal 272 under high cutting reaction force conditions. The two intersecting axes BHSA1, BHSA2 of the blade housing split axis BHSA intersect within the cylindrical opening 801g. The second split axis BHSA2 extends along an angled line that is transverse with respect to the first split axis BHSA1. As can be seen in FIGS. 11 and 29, the acute angle alpha α is formed between the first split axis BHSA1 of the first rearward extending split portion 801b and the second split axis BHSA2 of the second forward angled blade housing split portion 801c of the split 801a. In one exemplary embodiment, when viewed in plan view, e.g. FIG. 11, the angle alpha α is approximately 38°.

The termination location 801j of the split 801a corresponds to the position of circumferential ends 852a, 852b of the inner wall 852 of the blade support section 850. The termination location 801j of the split 801a corresponds to forward end portions 825a, 845a of the facing surfaces 825, 845 of the first and second body portions 820, 840 of the blade housing mounting section 802. When the blade housing 800 is in the first, blade supporting position 898, the split distance at the termination position 801j between the circumferential ends 852a, 852b of the inner wall 852 of the blade support section 850 (and similarly between the forward end portions 825a, 845a of the facing surfaces 825, 835) is the split distance D1 (FIG. 29) and when the blade housing 800 is in the second, blade changing position 899, the split distance at the termination position 801j between the circumferential ends 852a, 852b of the inner wall 852 of the blade support section 850 is the split distance D2 (FIG. 24).

In one exemplary embodiment, the thickness or depth of the blade housing 800 is substantially uniform along the entirety of the blade housing 800 and is approximately 0.23 in. In one exemplary embodiment, a radial length of the first and second body portions 820, 840, as measured along the blade housing vertical plane VP, is approximately 0.87 in. A width of the central region 811 of the mounting section 802, in the blade supporting position 898 of the blade housing 800, in one exemplary embodiment, is approximately 2.50 in. In one exemplary embodiment, the axial slot 830, as measured along the central axis SCA of the slot 830, is approximately 0.84 in. A diameter of the enlarged ends 832, 834 of the slot 830 is approximately 0.44 in, while the width W between facing wall portions 837a, 837b of the central passageway 836 is approximately 0.40 in. In one exemplary embodiment, the axial slot 830 includes a linear central passageway 836. If, however, a longer axial slot is required given the size and characteristics of the annular rotary knife, or for other reasons, an axial slot with an arcuate central passageway could be utilized. As noted previously, it is understood, that these dimensions will necessarily change based on the size and configuration, characteristics and parameters of the rotary knife blade to be supported by the blade housing, the blade-blade housing bearing structure, and other parameters and characteristics of the power operated rotary knife 100 and components thereof.

Expansion Sleeve Assembly 900

The expansion sleeve assembly 900 of the present disclosure includes the split lock sleeve 910, the first threaded fastener 950, which extends through a central opening of the split lock sleeve 910, and a second threaded fastener 990, which extends through a radially expandable between the first, uncompressed condition 998 and the second, compressed condition 999. The split lock sleeve 910 is constrained within the axial slot 830 of the first body portion 820 of the blade housing mounting section 802. The split lock sleeve 910 includes the cylindrical wall 912 extending between the first upper end 914 and the second lower end 916. The cylindrical wall 912 of the split lock sleeve 910 defines the through bore or central opening 920 of the split lock sleeve 910 which is centered about a split lock sleeve central axis LSA. The cylindrical wall 912 includes the axial split 930 of the split lock sleeve 910 and allows for the split lock sleeve 910 to move between the first, uncompressed condition 998 of the split lock sleeve 910 split characterized by a first outer diameter of the split lock sleeve 910 and the second, compressed condition 999 of the split lock sleeve 910 characterized by a second outer diameter, the first diameter being greater that the second diameter. The split lock sleeve 910 assumes its first, uncompressed condition 998 (corresponding to the first outer diameter) when seated in either the enlarged first end portion 832 or the enlarged second end portion 834 of the axially extending slot 830 of the first body portion 820 of the blade housing mounting section 802. The split lock sleeve 910 assumes its second, compressed condition 999 (corresponding to the second, smaller outer diameter) when positioned in the central passageway 836 of the axially extending slot 830 of the first body portion 820 of the blade housing mounting section 802 as the first body portion 820 is moved from the first, blade supporting position 898 to the second, blade changing position 899 or vice versa. The split 930 is angled or helical with respect to the split lock sleeve central axis LSA, that is, the facing or opposing surfaces or ends 932, 934 of the cylindrical wall 912 adjacent the split 930 are not vertically aligned, but instead are overlapping or circumferentially offset. Stated another way, the first and second opposing surfaces or ends 932, 934 are overlapping in an axial direction of the split sleeve 910, that is, the opposing surfaces 932, 934 are overlapping as viewed along or in the direction along the split lock sleeve central axis LSA. In one exemplary embodiment, the angle between the split 930 and the planar upper and lower ends 914, 916 is approximately 45°. The angled or helical split 930 advantageously reduces the possibility that facing ends 932, 934 of the split lock sleeve 910 will be caught on or hung up on the cylindrical shaft 952 of the fastener 950 as the split lock sleeve 910 rotates within the axial slot 830. If the facing ends 932, 934 of the split lock sleeve 910 were to be caught or hung up on the fastener cylindrical shaft 952, this could result in improper operation of sleeve 910 and/or potentially allow the fastener 950 to slip out of the through bore 920 of the split lock sleeve 910.

The first threaded fastener 950 includes the enlarged head 960 extending at one end of a cylindrical shaft 952 having a threaded portion 954 opposite the enlarged head 960. In one exemplary embodiment, the enlarged head 960 of the threaded fastener 950 includes an uppermost hex head 962 and the inclined lower shoulder 970, which bears against the first upper end 914 of the cylindrical wall 912 of the split lock sleeve 910 when the fastener 950 is tightened, as described previously. The enlarged head 960 of the threaded fastener also includes the radially extending flange 980 positioned intermediate the uppermost hex head 962 and the inclined lower shoulder 970. The radially extending flange 980 bears against a portion of the lower surface 822 of the first body portion 820 in the region of the axial slot 830, when the fastener 950 is tightened, as described previously. The second threaded fastener 990 is similar in configuration to the first fastener 950 and includes the enlarged head 992 and the radially extending flange 994. The radially extending flange 994 bears against a portion of the lower surface 842 of the second body portion 840 in the region of the axial cylindrical opening 846, when the fastener 990 is tightened, as described previously.

Removal of Annular Rotary Knife Blade 300

As best seen in the schematic depictions of FIGS. 27 and 28, to remove the annular rotary knife blade 300 from the blade support section 850 of the split blade housing 800, the first body portion 820 is moved with respect to the second body portion 840 from the blade supporting position 898 to the blade changing position 899. To facilitate this movement of the first body portion 820, the upper surface 808 of the mounting section includes a rectangular blade housing expansion recess 808a in the region of the first body portion 820. First, the first fastener 950 is loosened sufficiently such that the inclined lower shoulder 970 of the enlarged head 960 of the fastener 950 is not bearing tightly against the first, upper end 914 of the split lock sleeve 910 and the radially extending flange 980 of the fastener 950 is not bearing tightly against the lower surface 822 of the first body portion 820 of the mounting section 802. The second fastener 990 remains tightly engaged with and bears against the lower surface 842 of the second body portion 840 of the mounting section 802.

Next, a screwdriver or similar tool 90 is inserted into inserted into the blade housing expansion recess 808a and the shaft of the screwdriver is levered against an upper corner 264 of the upper arcuate wall 260 of the forward portion 251 of the frame body 250 and an opening lateral force OLF is applied to the first body portion 820 to move or pivot the first body portion 820 away from second body portion 840 and thereby increase the blade housing diameter from the blade housing diameter BHD1 (corresponding to the blade supporting position 898 of the blade housing 800) to the blade housing diameter BHD2 (corresponding to the blade changing position 899) and thereby permit the annular rotary knife blade 300 to be removed from the blade support section 850 of the split blade housing 800. As the first body portion 820 is moved or shifted in the lateral direction LD away from the second body portion 840, the split lock sleeve 910 is compressed to the second, compressed condition 999 of the split lock sleeve 910 as the stationary sleeve 910 passes through the narrower central passageway 836 of the axial slot 830 of the first body portion 820 as the first portion 820 moves or pivots laterally away from the second body portion 830 of the blade housing mounting section 802. Advantageously, when the first body portion 820 has moved sufficiently such that the first body portion 820 reaches the second, blade changing position 899, characterized by the blade housing diameter BHD2, the split lock sleeve 910 springs back to its first, uncompressed condition 998 as it seats itself into the second, enlarged end portion 834 of the axial slot 830. As explained previously, this seating of the split lock sleeve 910 in the second, enlarged end portion 834 secures the blade housing 800 in the second, blade changing position 899, without the need for a continuing external application of force to the first portion 820. This facilitate the changing or sharpening of the annular rotary knife blade 300.

In order to return the blade housing 800 to the first, blade holding position 899, a sufficient closing lateral force CLF is applied to the first body portion 820 in the lateral direction LD which is opposite to the opening lateral force OLF in order to move or pivot the first body portion 820 laterally toward the second body portion 840 while overcoming the spring force of the split lock sleeve 910 and compress the split lock sleeve 910 to its second, compressed condition 999 of the split lock sleeve 910 as the stationary sleeve 910 passes through the narrower central passageway 836 of the axial slot 830 of the first portion 820 as the first portion 820 moves or pivots laterally toward the second portion 830. Upon returning the first, blade holding position 898 of the first portion 820 of the blade housing 800, the split lock sleeve 910 returns to its first, uncompressed condition 998 as it seats itself into the first, enlarged end portion 832 of the axial slot 830 to advantageously maintain the blade housing in the first, blade holding position 898. The first fastener 950 is then tightened such that the inclined lower shoulder 970 of the enlarged head 960 of the fastener 950 bears against the first, upper end 914 of the split lock sleeve 910 and the radially extending flange 980 of the fastener 950 bears against the lower surface 822 of the first body portion 820 of the mounting section 802 to secure the first body portion 820 in the first, blade holding position 898.

As described above, with the blade housing assembly 700 of the present disclosure, combined with a longer useful life of the annular rotary knife blade 300 afforded by the blade-blade housing bearing structure 550, as described above and as more fully described in previously incorporated by reference, U.S. Pat. No. 10,040,211, the operator is not required or permitted to make any adjustments to operating clearance during a work shift. Thus, the split blade housing 800 and expansion sleeve assembly 900 of the present disclosure advantageously provide for a single predetermined, consistent, desired operating clearance when the first body portion 820 is in the first, blade supporting position 898 and the split lock sleeve 910 is in the first, uncompressed condition 998 seated in the first enlarged end portion 832 of the axial slot 830 and the fastener 950 is tightened such that the inclined lower shoulder 970 of the enlarged head 960 of the fastener 950 is bearing against the first, upper end 914 of the split lock sleeve 910. Additionally, the expansion sleeve assembly 900 consistently sets the blade housing diameter to the single, reproducible diameter, namely, the blade housing diameter BHD1, when the first body portion 820 is in the first, blade supporting position 898 and the fastener 950 is tightened. Therefore, even if the annular rotary knife blade 300 must be removed during the course of a work shift for replacement, sharpening, or cleaning purposes, upon reassembly and movement of first body portion 820 to the first, blade supporting position 898, blade housing diameter is reset the predetermined, desired diameter BHD1 and the operating clearance between the rotary knife blade 300 and the blade housing 800 bearing regions 320, 860 is returned to the predetermined, desired operating clearance.

Axially above or axially spaced above, as used herein, means positioned above as viewed with respect to an axis, for example, the central axis of rotation R of the rotary knife blade 300, even if the two elements are not in axial alignment with respect to the axis. For example, the bearing region 320 of the rotary knife blade 300 is axially above or axially spaced above the cutting edge 361 of the rotary knife blade 300 with respect to the blade central axis of rotation R even though the blade bearing region 320 is spaced radially outwardly from the blade cutting edge 361 with respect to the blade central axis of rotation R. Similarly, the terms axially below or axially spaced below, as used herein, means positioned below as viewed with respect to an axis, for example, the central axis of rotation R of the rotary knife blade 300, even if the two elements are not in axial alignment with respect to the axis. For example, the cutting edge 361 of the rotary knife blade 300 is axially below or axially spaced below the bearing region 320 of the rotary knife blade 300 with respect to the blade central axis of rotation R even though the blade cutting edge 361 is spaced radially inwardly from the blade bearing region 320 with respect to the central axis of rotation R. Similarly, axially extending, as used here, means one element extends from and is positioned above or below a second element with respect to an axis, even if the two elements are not in axial alignment with respect to the axis. For example, the blade section 360 extends axially from the body 310 with respect to the blade axis of rotation R even though portions of the blade section 360 are spaced radially inwardly from the body 310 with respect to the blade central axis of rotation R. Similarly, the terms radially offset from, radially outward of, radially inward of, as used herein, means one element is positioned offset from a second element, as viewed along a radius line extending radially from an axis, for example, the central axis of rotation R of the rotary knife blade 300, even if the two elements are not in radial alignment along the radius line because one element is axially above or axially below the other element.

As used herein, terms of orientation and/or direction such as front, rear, forward, rearward, distal, proximal, distally, proximally, upper, lower, inward, outward, inwardly, outwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components.

What have been described above are examples of the present disclosure/invention. It is, of course, not possible to describe every conceivable combination of components, assemblies, or methodologies for purposes of describing the present disclosure/invention, but one of ordinary skill in the art will recognize that many further combinations and permutations of the present disclosure/invention are possible. Accordingly, the present disclosure/invention is intended to embrace all such alterations, modifications, and variations that fall within the spirit and scope of the appended claims.

What is claimed is:

1. A blade housing assembly for a power operated rotary knife, the blade housing assembly comprising:
   a split blade housing including:
      an annular blade support section including an inner wall;
      a mounting section extending from the blade support section; and
      a split extending through the mounting section and the inner wall of the blade support section and defining a split distance between first and second circumferential ends of the inner wall, the mounting section including a first body portion and a second body portion on opposite sides of the split, the first body portion including a slot extending axially through the first body portion having a first end portion and a second end portion connected by a passageway, a width of the passageway being smaller than a diameter of the second end portion, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and
   an expansion sleeve assembly extending through the slot, the expansion sleeve assembly being stationary with respect to the first body portion and including:
      a split sleeve having a central opening and a split extending between first and second ends of the split sleeve, a circumference of the split sleeve changeable between a first condition having a first circumference and a second condition having a second circumference, the first circumference of the split sleeve being greater than the second circumference; and
   the split sleeve is received in the second end portion of the slot to secure the first body portion in the second blade changing position, the split sleeve being in the first condition.

2. The blade housing assembly of claim 1 wherein the width of the passageway of the slot of the first body portion of the mounting section of the split blade housing is smaller than a diameter of the first end portion.

3. The blade housing assembly of claim 1 wherein the split sleeve is received in the first end portion of the slot to secure the first body portion in the first blade supporting position, the split sleeve being in the first condition.

4. The blade housing assembly of claim 1 wherein the expansion sleeve assembly further includes a fastener having an enlarged head and a shaft extending from the head, the shaft extending through the central opening of the split sleeve, the fastener movable between an engagement position and a disengagement position, in the engagement position of the fastener, the enlarged head of the fastener engaging the split sleeve to maintain the split sleeve in one of the first and second end portions of the slot and secure the first body portion in one of the first blade supporting position and the second blade changing position.

5. The blade housing assembly of claim 1 wherein in the second condition of the split sleeve, the second circumference is sized to pass through the passageway of the slot of the first body portion.

6. The blade housing assembly of claim 5 wherein movement of the first body portion with respect to the second body portion between the first blade supporting position and the second blade changing position causes radial compression of the split sleeve from the first circumference to the second circumference as the split sleeve passes through the passageway of the slot.

7. The blade housing assembly of claim 1 wherein the split sleeve of the expansion sleeve assembly includes first and second opposing surfaces defining the split of the split sleeve, the first and second opposing surfaces overlapping in an axial direction of the split sleeve.

8. The blade housing assembly of claim 1 wherein the inner wall of the blade support section is coincident with an inner wall of the mounting section, and the split extending through the mounting section includes a post-receiving opening intermediate and spaced from an outer wall of the mounting section and the inner wall of the mounting section.

9. The blade housing assembly of claim 1 wherein the second body portion includes an opening extending axially through the second body portion, and a fastener extends through the opening.

10. The blade housing assembly of claim 1 wherein the annular blade support section of the blade housing is centered about a blade housing center line, and a direction of the split through the mounting section at the inner wall of the blade support section is offset from the blade housing center line.

11. A blade housing assembly for a power operated rotary knife, the blade housing assembly comprising:
an split blade housing including:
an annular blade support section including an inner wall;
a mounting section extending from the blade support section; and
a split extending through the mounting section and the inner wall of the blade support section and defining a split distance between first and second circumferential ends of the inner wall, the mounting section including a first body portion and a second body portion on opposite sides of the split, the first body portion including a slot extending axially through the first body portion having a first end portion and a second end portion connected by a passageway, a width of the passageway being smaller than a diameter of the first end portion, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and
an expansion sleeve assembly extending through the slot, the expansion sleeve assembly being stationary with respect to the first body portion and including:
a split sleeve having a central opening and a split extending between first and second ends of the split sleeve, a circumference of the split sleeve changeable between a first condition having a first circumference and a second condition having a second circumference, the first circumference of the split sleeve being greater than the second circumference; and
the split sleeve is received in the first end portion of the slot to secure the first body portion in the first blade supporting position, the split sleeve being in the first condition.

12. The blade housing assembly of claim 11 wherein the width of the passageway of the slot of the first body portion of the mounting section of the split blade housing is smaller than a diameter of the second end portion.

13. The blade housing assembly of claim 11 wherein the split sleeve is received in the second end portion of the slot to secure the first body portion in the second blade changing position, the split sleeve being in the second condition.

14. The blade housing assembly of claim 11 wherein the expansion sleeve assembly further includes a fastener having an enlarged head and a shaft extending from the head, the shaft extending through the central opening of the split sleeve, the fastener movable between an engagement position and a disengagement position, in the engagement position of the fastener, the enlarged head of the fastener engaging the split sleeve to maintain the split sleeve in one of the first and second end portions of the slot and secure the first body portion in one of the first blade supporting position and the second blade changing position.

15. The blade housing assembly of claim 11 wherein in the second condition of the split sleeve, the second circumference is sized to pass through the passageway of the slot of the first body portion.

16. The blade housing assembly of claim 15 wherein movement of the first body portion with respect to the second body portion between the first blade supporting position and the second blade changing position causes radial compression of the split sleeve from the first circumference to the second circumference as the split sleeve passes through the passageway of the slot.

17. A blade housing assembly for a power operated rotary knife, the blade housing assembly comprising:
a split blade housing including:
an annular blade support section including an inner wall;
a mounting section extending from the blade support section; and
a split extending through the mounting section and the inner wall of the blade support section and defining a split distance between first and second circumferential ends of the inner wall, the mounting section including a first body portion and a second body portion on opposite sides of the split, the first body portion including a slot extending axially into the first body portion having a first end portion and a second end portion connected by a passageway, a width of the passageway being smaller than a diameter of at least one of the first and second end portions, the first body portion being movable with respect to the second body portion between a first blade supporting position wherein the split distance between the first and second circumferential ends of the inner wall is a first value and a second blade changing position wherein the split distance between the first and second circumferential ends of the inner wall is a second value, the second value being greater than the first value; and
an expansion sleeve assembly extending into the slot, the expansion sleeve assembly being stationary with respect to the first body portion and including:
a split sleeve having a central opening and a split extending between first and second ends of the split sleeve, a circumference of the split sleeve changeable between a first condition having a first circumference and a second condition having a second circumference, the first circumference of the split sleeve being greater than the second circumference, the split sleeve being in the first condition in at least one of the first and second end portions.

18. The blade housing assembly of claim 17 wherein the width of the passageway of the slot of the first body portion of the mounting section of the split blade housing is smaller than a diameter of the first end portion and further wherein the split sleeve is received in the first end portion of the slot to secure the first body portion in the first blade supporting position, the split sleeve being in the first condition.

19. The blade housing assembly of claim 17 wherein the width of the passageway of the slot of the first body portion of the mounting section of the split blade housing is smaller than a diameter of the second end portion and further wherein the split sleeve is received in the second end portion of the slot to secure the first body portion in the second blade changing position, the split sleeve being in the first condition.

20. The blade housing assembly of claim 17 wherein in the second condition of the split sleeve, the second circumference is sized to pass through the passageway of the slot of the first body portion and further wherein movement of the first body portion with respect to the second body portion between the first blade supporting position and the second blade changing position causes radial compression of the split sleeve from the first circumference to the second circumference as the split sleeve passes through the passageway of the slot.

* * * * *